United States Patent
Brock et al.

(10) Patent No.: US 7,927,413 B2
(45) Date of Patent: Apr. 19, 2011

(54) METHOD AND APPARATUS FOR MAKING ASPHALT CONCRETE USING FOAMED ASPHALT CEMENT

(75) Inventors: J. Donald Brock, Chattanooga, TN (US); Mike Varner, Chattanooga, TN (US); Greg Renegar, Ooltewah, TN (US)

(73) Assignee: Astec, Inc., Chattanooga, TN (US)

( * ) Notice: Subject to any disclaimer, the term of this patent is extended or adjusted under 35 U.S.C. 154(b) by 841 days.

(21) Appl. No.: 11/978,263

(22) Filed: Oct. 29, 2007

(65) Prior Publication Data

US 2008/0259714 A1 Oct. 23, 2008

Related U.S. Application Data

(60) Provisional application No. 60/925,070, filed on Apr. 17, 2007.

(51) Int. Cl.
| | |
|---|---|
| C08L 95/00 | (2006.01) |
| C08L 93/00 | (2006.01) |
| E01C 7/00 | (2006.01) |
| E01C 7/18 | (2006.01) |
| E01C 19/02 | (2006.01) |
| E01C 19/10 | (2006.01) |

(52) U.S. Cl. ............ 106/122; 106/283; 427/138; 366/7; 366/8

(58) Field of Classification Search .................. 366/3, 4, 366/5, 6, 7; 106/122, 283; 427/138
See application file for complete search history.

(56) References Cited

U.S. PATENT DOCUMENTS 2,003,860 A 3/1931 McConnaughay
(Continued)

FOREIGN PATENT DOCUMENTS

GB 2389583 12/2003
(Continued)

*Primary Examiner* — Tony G Soohoo
(74) *Attorney, Agent, or Firm* — Chambliss, Bahner & Stophel, P.C.

(57) ABSTRACT

A foamed asphalt cement nozzle assembly is adapted for use in connection with a mixer for mixing aggregate materials and asphalt cement to make asphalt concrete. The foamed asphalt cement nozzle assembly includes a foamed cement mixing chamber, a first inlet for liquid asphalt cement and a second inlet for water, each of which is in fluid communication with the foamed cement mixing chamber. An outlet for foamed asphalt cement is also provided, which outlet is in fluid communication with both the foamed cement mixing chamber and the mixer. The invention also comprises a method for making asphalt concrete using foamed asphalt cement. The method includes introducing aggregate materials into the mixer and heating the aggregate materials to a temperature at least as high as the boiling point of water but no higher than about 285° F. The method also includes introducing liquid asphalt cement and the water to the foamed cement mixing chamber so as to produce foamed asphalt cement, and introducing foamed asphalt cement into the mixer and mixing it with aggregate materials at a temperature at least as high as the boiling point of water but no higher than about 285° F. to produce asphalt concrete. The invention also includes an apparatus for making asphalt concrete which includes a foamed asphalt cement nozzle assembly.

13 Claims, 22 Drawing Sheets

U.S. PATENT DOCUMENTS

| | | |
|---|---|---|
| 2,290,720 A | 7/1942 | Watson |
| 2,421,345 A | 5/1947 | McConnaughay |
| 2,917,395 A | 12/1959 | Csanyi |
| 2,941,893 A | 6/1960 | McConnaughay |
| 3,110,604 A | 11/1963 | McConnaughay |
| 3,423,222 A | 1/1969 | McConnaughay |
| 3,672,507 A | 6/1972 | Paull, Jr. |
| 3,840,215 A | 10/1974 | McConnaughay |
| 3,868,263 A | 2/1975 | McConnaughay |
| 3,979,323 A | 9/1976 | Spahr et al. |
| 4,348,237 A | 9/1982 | Ruckel |
| 4,480,789 A | 11/1984 | Kemper |
| 4,592,507 A | 6/1986 | Benedict |
| 4,637,753 A | 1/1987 | Swisher, Jr. |
| 4,692,350 A | 9/1987 | Clarke et al. |
| 4,715,720 A | 12/1987 | Brock |
| 4,767,060 A | 8/1988 | Shay et al. |
| 4,867,572 A | 9/1989 | Brock et al. |
| 4,874,432 A | 10/1989 | Kriech et al. |
| 5,054,931 A | 10/1991 | Farnham et al. |
| 5,143,345 A | 9/1992 | Miki et al. |
| 5,203,693 A | 4/1993 | Swanson |
| 5,223,031 A | 6/1993 | Sugi et al. |
| 5,251,976 A | 10/1993 | Milstead |
| 5,366,308 A | 11/1994 | Crispino |
| 5,401,312 A | 3/1995 | Hanst |
| 5,423,606 A | 6/1995 | Milstead |
| 5,486,554 A | 1/1996 | Truax |
| 5,584,597 A | 12/1996 | Lemelson |
| 5,772,317 A | 6/1998 | Butler |
| 5,827,360 A | 10/1998 | Salminen |
| 5,867,572 A | 2/1999 | MacDonald et al. |
| 6,565,281 B2 | 5/2003 | Bruns et al. |
| 6,712,895 B1 | 3/2004 | Hoad |
| 6,793,964 B2 | 9/2004 | Hoad |
| 6,846,354 B2 | 1/2005 | Larsen et al. |

FOREIGN PATENT DOCUMENTS

| | | |
|---|---|---|
| JP | 2002212429 | 7/2002 |

METHOD AND APPARATUS FOR MAKING ASPHALT CONCRETE USING FOAMED ASPHALT CEMENT

CROSS REFERENCE TO RELATED APPLICATION

This application claims the benefit of provisional Application No. 60/925,070, which was filed on Apr. 17, 2007.

FIELD OF THE INVENTION

This invention relates generally to a method and apparatus for making asphalt concrete. According to the method of the invention, water is mixed with asphalt cement and the resulting foamed asphalt cement is introduced into an asphalt concrete mixer containing aggregate materials.

BACKGROUND AND DESCRIPTION OF THE PRIOR ART

Production facilities for making asphalt concrete to be used as a paving composition are well-known. Generally, such production facilities can be categorized as either batch plants or continuous production plants. In a conventional batch plant, a quantity of aggregate materials is heated and dried and placed in a mixer along with a quantity of liquid asphalt cement. The aggregate materials and asphalt cement are thoroughly mixed and discharged as a batch of asphalt concrete into a storage bin or a delivery truck. In a conventional continuous production plant, aggregate materials and asphalt cement are continuously introduced into the plant and asphalt concrete is continuously being produced. Since the raw materials for asphalt concrete are continuously being introduced, the proportions of the components in the mix must be controlled by metering the relative rates at which the various components are introduced.

A common type of continuous production plant is a combination dryer/mixer. In one such device, aggregate materials are introduced into the upper end of an inclined rotating drum. A burner mounted at the upper end of the drum heats the air flowing through the drum, and the aggregate material is heated and dried as it is tumbled through the heated gas flow in the drum. Liquid asphalt cement is introduced into the lower part of the drum, where it mixes with the dried aggregate materials to produce an asphalt concrete mixture. This type of dryer/mixer is known as a parallel-flow mixer, because all of the materials move through the drum in a direction away from the source of the burner flame. One disadvantage of a parallel-flow mixer is that it is not thermally efficient. Aggregate materials are generally wet and cold when introduced into the mixer. Before such materials can acquire significant heat, the moisture they hold must be evaporated. In a parallel-flow mixer, the aggregate materials are exposed to the highest temperatures while still cold and damp. By the time the aggregate materials are dried, they have moved down the drum into a cooler zone.

U.S. Pat. No. 4,867,572 of Brock et al. describes a type of continuous production plant known as a counter-flow dryer/mixer. This mixer comprises an inclined inner drum mounted for rotation about its long axis. An outer drum is disposed around the rotating inner drum so as to form an annular space between the outside of the inner drum and the inside of the outer drum. Flights or paddles are mounted on both the inner and outer surfaces of the inner drum. A burner is located at the lower end of the inner drum, and aggregate materials are introduced into the upper end of the inner drum. Because of the inclination and rotation of the inner drum, aggregate materials that are introduced into the upper end of the inner drum are dried and heated as they are tumbled down towards the lower end and towards the source of the burner flame. At the lower end of the inner drum, the dried and heated aggregate materials are discharged into the annular space between the inner drum and the outer drum. Liquid asphalt cement is also introduced into this annular space, and continued rotation of the inner drum causes the asphalt cement to be thoroughly mixed with the heated and dried aggregate materials to produce an asphalt concrete mixture. The flights on the outside of the rotating inner drum assist in this mixing and also serve to direct the asphalt concrete mixture towards the upper end of the inner drum, as the inner drum is rotated, to an asphalt concrete discharge outlet.

Asphalt concrete is also conventionally made in continuous plants comprised of separate dryers and mixers. Some such plants employ a rotating dryer drum in which aggregate materials are introduced. A burner is located at one end of the drum and the aggregate materials are moved along the drum through the heated gases generated by the burner in either parallel flow or counter-current flow to an outlet. A separate mixer, such as a rotating drum mixer or a pugmill, is employed to mix the dried aggregate materials from the dryer drum with liquid asphalt cement.

Because some conventional mixers (including dryer/mixers) expose liquid asphalt cement to the high-temperature gases used for drying and heating the aggregate materials and to the steam generated in the drying process, a "blue smoke" of hydrocarbon gases can be stripped from the light oil components of the asphalt cement. Although relatively insignificant as an emission (by weight), "blue smoke" is visible and can be unsightly. In order to eliminate "blue smoke", it has been deemed desirable to (1) direct the "blue smoke" into the burner for incineration, or (2) filter the "blue smoke" from the plant and condense it for disposal. U.S. Pat. No. 5,054,931 of Farnham et al. describes a counter-flow drum mixer in which a burner shield is employed to isolate the liquid asphalt cement from the hot gases generated by the burner. A venturi mounted in the shield directs all fumes, including steam and "blue smoke", produced in the lower end of the drum through the flame of the burner. In a second embodiment, the Farnham patent describes the creation of a foamed asphalt cement mixture by mixing liquid asphalt cement with water and pressurized air. This foamed mixture may then be introduced through a conventional asphalt cement inlet pipe (instead of liquid asphalt cement) into the area between the burner and the burner shield to be mixed with the dried aggregate materials therein.

U.S. Pat. No. 6,846,354 of Larsen et al. describes a method for making asphalt concrete using two types of asphalt cement, a hard component and a soft component. According to this method, the hard component comprises an asphalt cement foam having a penetration of less than 100 dmm, whereas the soft component comprises asphalt cement having a penetration of at least 200 dmm. According to the method of the Larsen patent, a quantity of aggregate material is heated to a temperature of approximately 265° F. (130° C.). This heated aggregate material is then mixed with a quantity of soft asphalt cement having a temperature of about 247° F. (120° C.) to form a warm mix of asphalt concrete. A hard asphalt foam is then made by injecting a hard component of asphalt cement into a foaming chamber, injecting water into the asphalt cement flow, and then homogenizing the foam mixture in a static mixer in a mixing chamber. A quantity of this hard asphalt cement foam equal to that of the soft asphalt cement previously added is then dispensed from the mixing chamber into the warm mix and mixed therewith. A filler comprising about 5% of the end product is added to this mixture at about 67° F. (20° C.) to produce the end product.

It is believed that the Larson process requires a foamed hard component of asphalt cement to reduce the temperature of the resulting asphalt concrete mix and a soft component to insure sufficient compaction of the resulting product. It would be desirable if a method and apparatus could be developed which is capable of employing a single grade of asphalt cement to produce an asphalt concrete product at temperatures lower than conventional hot mix temperatures. It would also be desirable if such a method and apparatus could be developed that would obtain sufficient compaction without requiring inclusion of a soft component of asphalt cement.

EXPLANATION OF TECHNICAL TERMS

As used herein, the term "aggregate materials" and similar terms refer to crushed stone and other particulate materials that are used in the production of asphalt concrete, such as, for example, crushed limestone and other types of crushed stone, shredded or comminuted mineral and cellulosic fibers, gravel, sand, lime and other particulate additives.

As used herein, the terms "asphalt cement", "AC", and similar terms refer to a material that is used in combination with aggregate materials in the production of asphalt concrete. Asphalt cement acts as the binder for various aggregate materials in the production of asphalt concrete.

As used herein, the terms "recycled asphalt product", "RAP" and similar terms refer to a comminuted or crushed product containing aggregate materials bound together by asphalt cement. RAP typically comprises crushed or comminuted recycled asphalt paving materials, crushed, shredded or comminuted shingles and other asphalt cement-containing products.

As used herein, the term "asphalt concrete" and similar terms refer to a bituminous paving mixture that is produced, using asphalt cement and any of various aggregate materials, in an asphalt concrete production plant. Asphalt concrete may be made with any of various aggregate materials, asphalt cement and RAP.

As used herein, the term "hot mix asphalt" and similar terms refer to a type of asphalt concrete that is produced conventionally, using liquid asphalt cement, at a temperature within the range of about 300° F. to about 350° F.

As used herein, the term "mixer" and similar terms refer to devices in which aggregate materials are mixed with asphalt cement to produce asphalt concrete. Such mixers may include both continuous and batch plants, combination dryer/mixers of a counter-flow or parallel design, rotary drum mixers of a counter-flow or parallel design, as well as pugmills and the like.

SUMMARY OF THE INVENTION

The invention comprises a foamed asphalt cement nozzle assembly for use in connection with a mixer that is adapted to mix aggregate materials and asphalt cement in the preparation of asphalt concrete. This foamed asphalt cement nozzle assembly includes a foamed cement mixing chamber, a first inlet for liquid asphalt cement and a second inlet for water, each of which is in fluid communication with the foamed cement mixing chamber. Means are provided for introducing liquid asphalt cement and water into the foamed cement mixing chamber. The foamed asphalt cement nozzle assembly also includes an outlet for foamed asphalt cement which is in fluid communication with both the foamed cement mixing chamber and the mixer. The invention also comprises a method for making asphalt concrete using foamed asphalt cement. The method includes introducing aggregate materials into a mixer at a temperature at least as high as the boiling point of water but no higher than about 285° F. The method also includes introducing liquid asphalt cement and water to the foamed cement mixing chamber to produce foamed asphalt cement, and introducing such foamed asphalt cement from the outlet of the nozzle assembly into the mixer where it is mixed with aggregate materials at a temperature at least as high as the boiling point of water but no higher than about 285° F. to produce asphalt concrete.

The invention also includes an apparatus for making asphalt concrete which includes a foamed asphalt cement nozzle assembly. A preferred embodiment of such apparatus also includes a fixed outer drum having an inclined longitudinal axis, an upper end, a lower end and an outlet for asphalt concrete at the upper end. Mounted within the fixed outer drum is a rotatable inner drum having a longitudinal axis that is coincident with the longitudinal axis of the fixed outer drum, an upper end, a lower end, an inlet for aggregate materials at the upper end, a plurality of outer mixing flights on its outer surface and a plurality of inner mixing flights on its inner. The inner drum has a diameter that is less than the outer drum diameter so that an annular mixing chamber is defined between the inner and outer drums. In addition, the inner drum has an outlet at its lower end through which aggregate materials are discharged into the annular mixing chamber. The apparatus includes means for heating the interior of the inner drum so that aggregate materials introduced therein are heated to a temperature at least as high as the boiling point of water but no higher than about 285° F.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
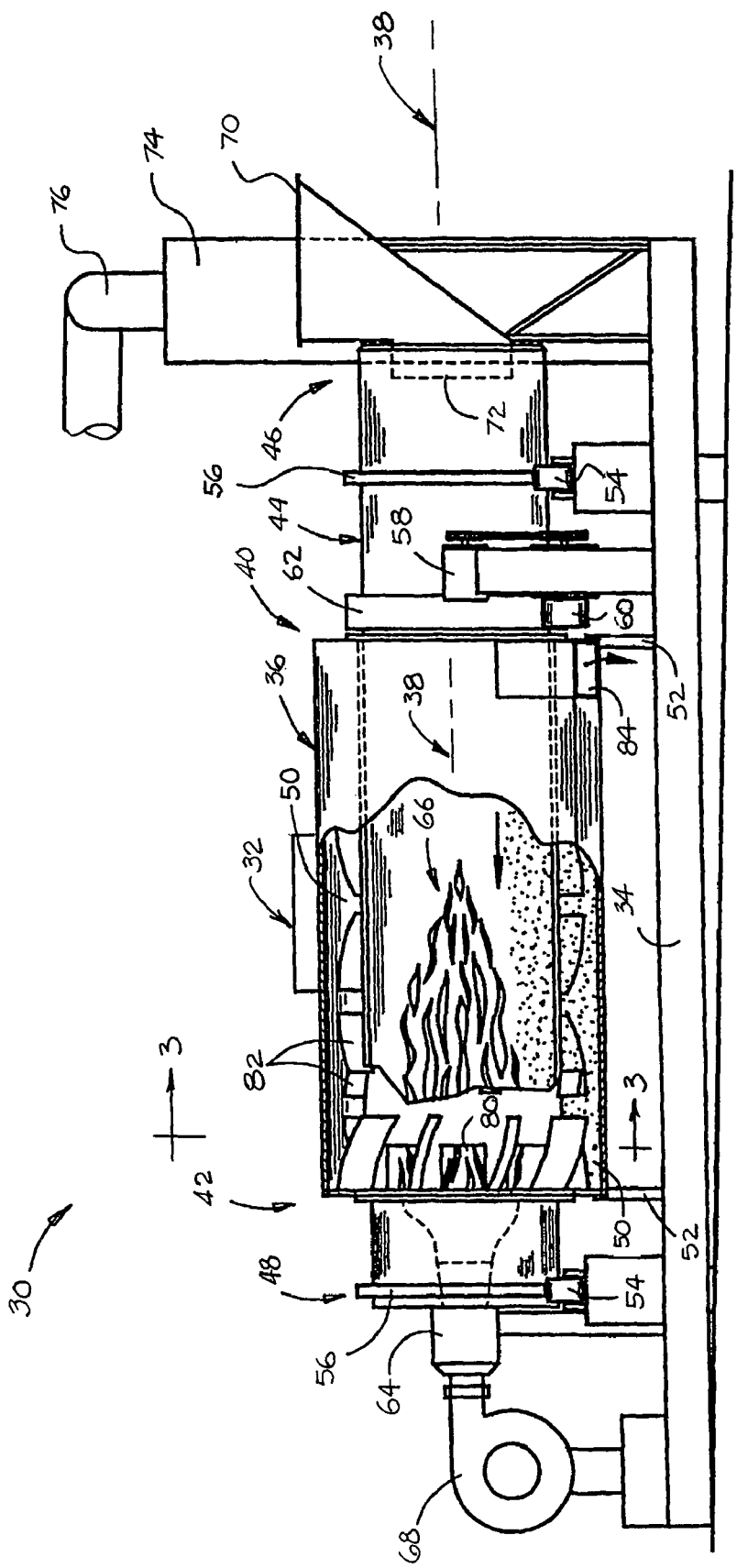
FIG. 1 is a partially cut-away side view of a first embodiment of an asphalt concrete mixer according to the present invention.
Figure 2:
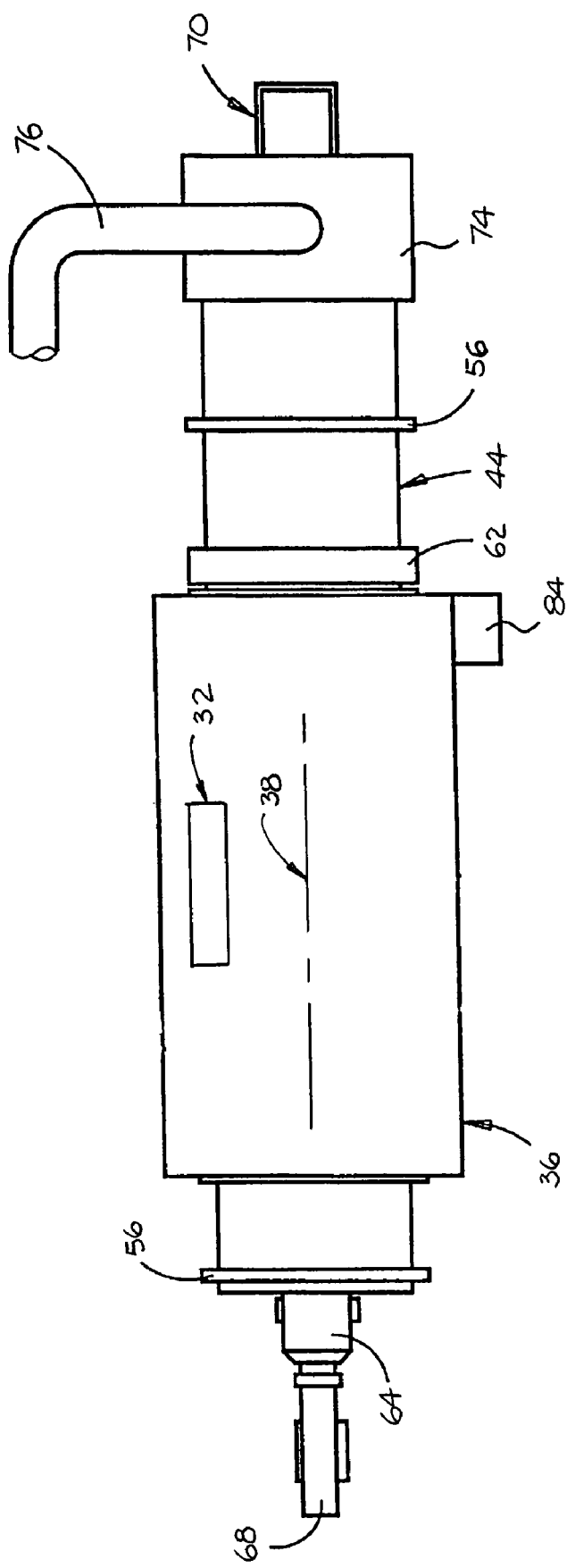
FIG. 2 is a top view of the embodiment of FIG. 1.
Figure 3:
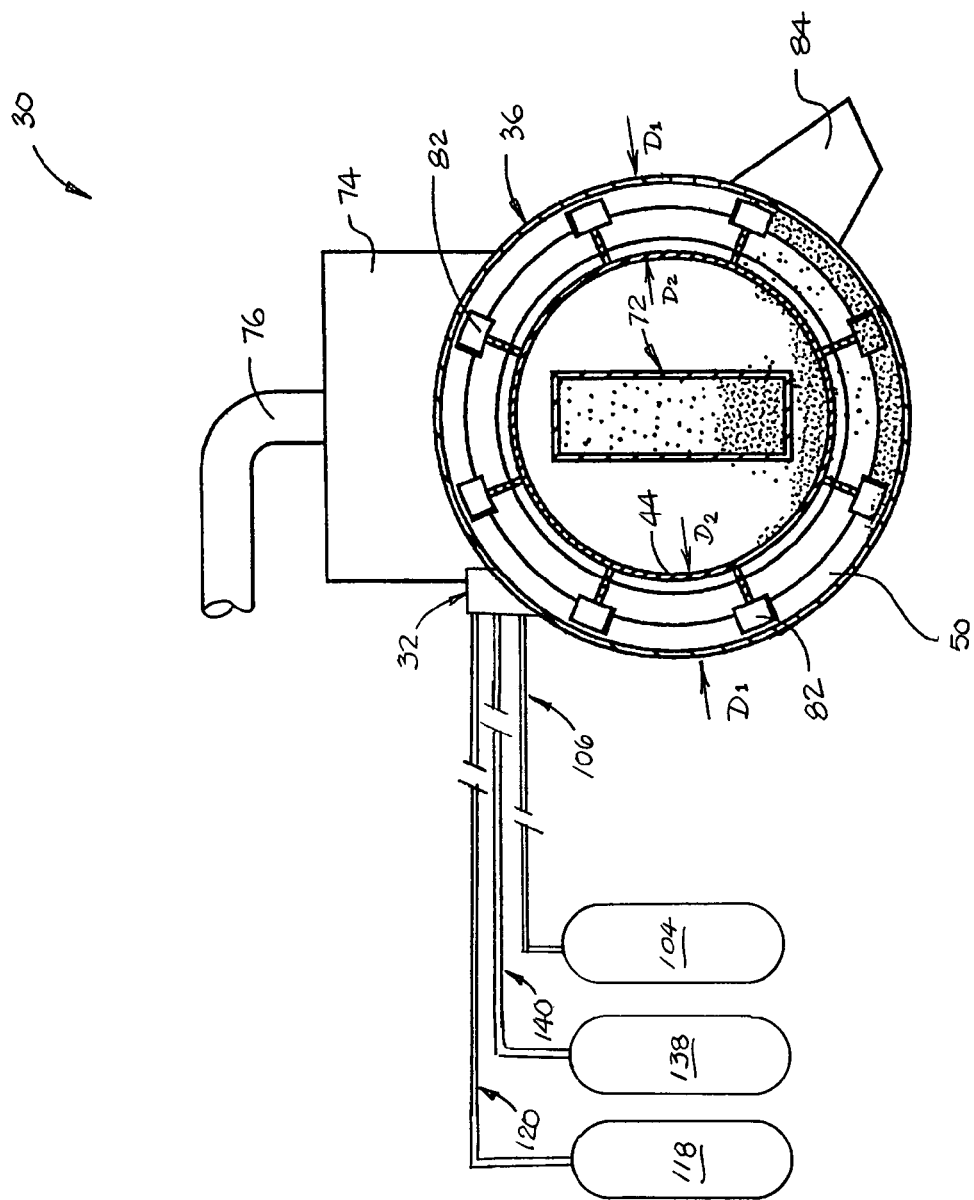
FIG. 3 illustrates a partial sectional view of the asphalt concrete mixer of FIG. 1, taken along line 3-3 of FIG. 1, along with associated components.

FIGS. 1 through 3 illustrate a first embodiment of a hot-mix asphalt plant or asphalt concrete mixer 30 having a foamed asphalt cement nozzle manifold 32 (shown schematically in FIGS. 1-3) comprising a plurality of foamed asphalt cement nozzle assemblies (described in more detail hereinafter). As can be seen in FIG. 1, asphalt concrete mixer 30 is a counterflow dryer/mixer combination such as is sold by Astec Inc. of Chattanooga, Tenn. under its DOUBLE BARREL trademark. Mixer 30 is supported on a frame 34 and includes a generally cylindrical fixed outer drum 36 having a longitudinal axis 38 that is inclined with respect to the horizontal so that the outer drum has an upper end 40 and a lower end 42. Mixer 30 also includes a heating/drying chamber comprised of a generally cylindrical, hollow inner drum 44 having a longitudinal axis that is coincident with longitudinal axis 38 of the fixed outer drum.

Outer drum 36 has a diameter $D_1$ (shown in FIG. 3) that is greater than the diameter $D_2$ of inner drum 44. Furthermore, since the longitudinal axis of inner drum 44 is coincident with axis 38 of outer drum 36, inner drum 44 is inclined at the same angle with respect to the horizontal as outer drum 36, so that inner drum has an upper end 46 and a lower end 48. The angle at which the mixer is operated and transported may be fixed or it may be capable of adjustment by means of a hydraulic lift (not shown) or other means known to those having ordinary skill in the art to which the invention relates. By increasing or decreasing the angle at which the mixer is operated, the amount of time that aggregate material spends in the heating/drying chamber may be decreased or increased, respectively, thereby allowing the operator to control the degree to which the aggregate material is heated or dried without necessitating a change in the operating rate of the mixer.

Because diameter $D_1$ of outer drum 36 is greater than diameter $D_2$ of inner drum 44, an annular mixing chamber 50 is provided between the outer drum and the inner drum. Outer drum 36 is fixedly mounted to the frame 12 on a plurality of supports 52 and encircles at least a portion of inner drum 44. Inner drum 44 is rotatably mounted on the frame 34 by means of bearings 54 mounted to the frame which engage races 56 located on the circumference of the drum. A motor 58 is adapted to rotatably drive a drive sprocket (not shown, but located in housing 60) that is in driving engagement with a chain drive (not shown, but located in housing 62 on the outer surface of the inner drum) to rotate drum 44 in a conventional manner. Alternative drive systems such as are known to those having ordinary skill in the art to which the invention relates may also be employed to rotate inner drum 44 with respect to fixed outer drum 36.

Mixer 30 also includes a burner 64 at lower end 48 which is adapted to heat and dry the aggregate material within inner drum 44. As shown in FIG. 1, burner 64 is adapted to direct a flame 66 into the interior of the inner drum. Typical fuels that are burned in the burner include oil, natural gas, LP gas, and pulverized coal. Fan 68 is used to introduce a mixture of fuel and air into the burner, where the mixture is ignited to produce the flame and gases of combustion that heat and dry the aggregate materials which pass through the interior of the drum. As shown in FIGS. 1 and 2, chute 70 provides for introduction of aggregate materials into inner drum 44. This chute leads to inlet 72 (not shown in FIG. 2) at upper end 46 of inner drum 44. Due to the inclination and rotation of the inner drum, the aggregate materials will be conveyed from inlet 72 towards lower end 42 of the drum. As the aggregate materials are so conveyed, a plurality of inner mixing flights or paddles (not shown) mounted on the inner surface of the inner drum lift and tumble the aggregate materials in the inner drum as it rotates with respect to the outer drum, thereby enabling a more thorough heating and drying of the aggregate materials as they are passed through the heated gases flowing through the drum. An exhaust fan (not shown) may also be employed in combination with burner 64 to direct a flow of exhaust material from the lower end 42 of drum 44, through the drum, and out the upper end 46. The exhaust material, which includes gases of combustion and entrained aggregate dust, is directed out of the upper end 46 of the drum 44 through plenum 76 and outlet 78 to a conventional dust filtering device (not shown), such as a baghouse, cyclone separator, or wet-wash system.

Inner drum 44 is provided with an outlet 80, preferably comprised of a plurality of openings in the drum wall, at or near its lower end 48, for discharge of heated aggregate materials into annular mixing chamber 50. Also in fluid communication with annular mixing chamber 50 is a plurality of foamed asphalt cement nozzle assemblies mounted in foamed asphalt cement nozzle manifold 32, which nozzle assemblies are adapted to introduce foamed asphalt cement into the annular mixing chamber according to the invention. A plurality of paddle-like outer mixing flights or blades 82 are mounted to the outer surface of inner drum 44 within outer drum 36. These outer mixing flights are arranged so that, as drum 44 rotates, the mixing flights span substantially the whole distance between the outer surface of inner drum 44 and the inner surface of outer drum 36. Outer mixing flights 82 are also preferably angled in such a manner that in addition to mixing the aggregate materials and foamed asphalt cement in the mixing chamber, the flights convey the resulting asphalt concrete mixture to outlet 84 of the annular mixing chamber that is provided through outer drum 36 at or near its upper end 40. The asphalt concrete paving material may then be discharged from annular mixing chamber 50 through outlet 84.

Because inner drum 44 is preferably constructed of heat-conductive material, heat produced by burner 64 is transferred from inside the inner drum to annular mixing chamber 50. It is preferred that the temperature of the aggregate materials be at least as high as the boiling point of water but no higher than about 285° F. during mixing with the foamed asphalt cement within the annular mixing chamber.

Figure 4:
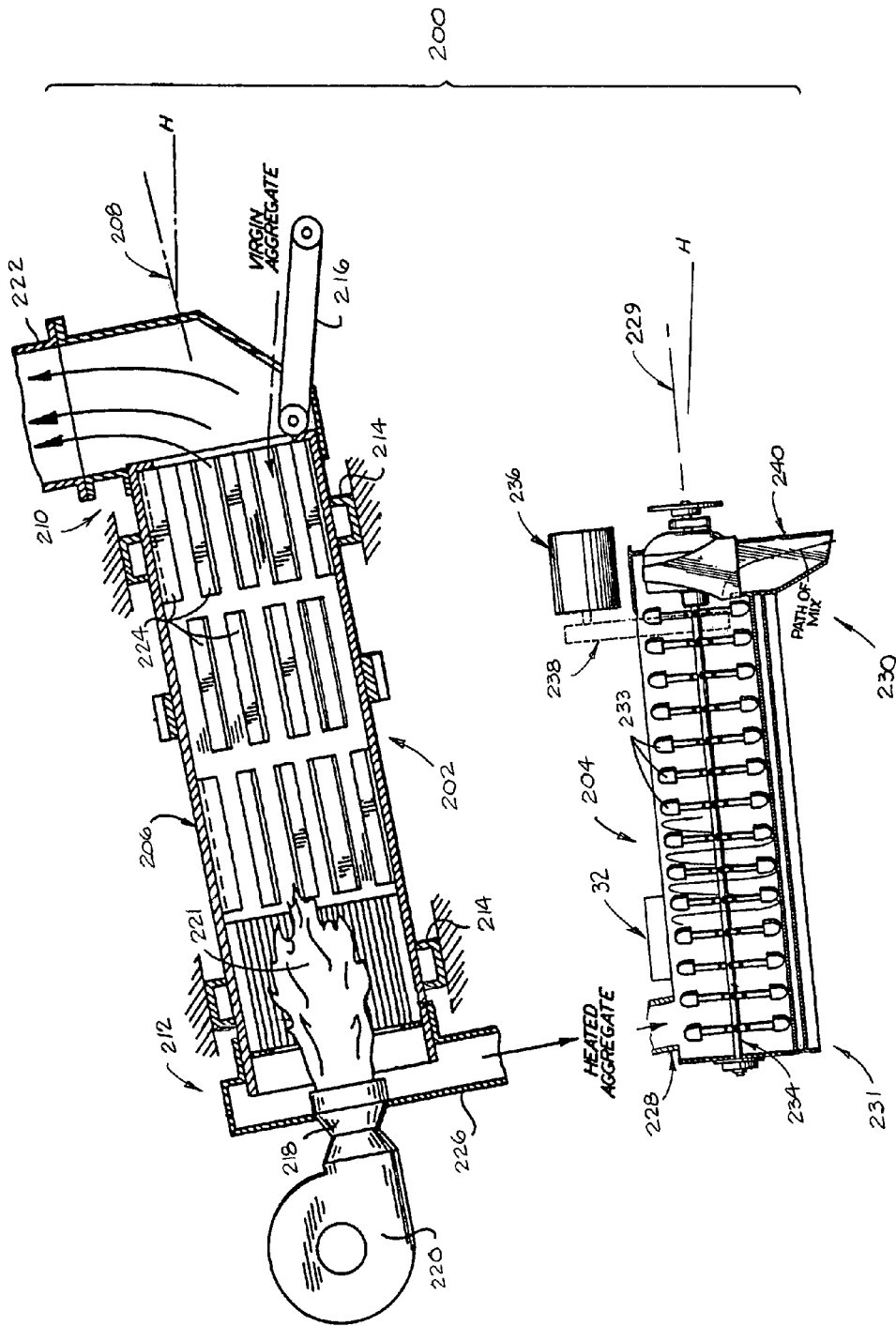
FIG. 4 is a partially cut-away side view of a second embodiment of an asphalt concrete mixer, which comprises separate dryer and mixer components, that may be used in connection with a foamed asphalt cement nozzle assembly according to the invention.

Referring now to FIG. 4, an alternative embodiment of an asphalt concrete mixer which includes foamed asphalt cement nozzle manifold 32 is shown. As shown therein, mixer 200 includes rotary drum dryer 202 and associated pugmill 204. Dryer 202 comprises an elongate hollow drum 206 having a central axis of rotation 208 which is inclined with respect to the horizontal (H) so as to define an upper end 210 and a lower end 212. Drum 206 is mounted on a frame comprising bearing sleeves 214 so as to be rotatable about central axis 208 by a drive means (not shown) which may be similar to that used to rotate inner drum 44 of mixer 30. Delivery conveyor 216 is provided adjacent upper end 210 of drum dryer 202 for introduction of aggregate materials into the interior of the drum dryer. Drum dryer 202 also includes burner 218 which is mounted at the lower end of the drum dryer for directing a high temperature flame into the interior of the device. Burner 218 is of conventional design and includes blower 220 which charges a mixture of fuel and air into the burner, where such mixture is ignited to produce a flame 221 and gases of combustion for heating the interior of drum dryer 202. Exhaust duct 222 is located at the upper end of drum dryer 202 for exhausting the gases of combustion (and entrained dust) from the drum dryer. The exhaust flow may be conveyed to a a conventional dust filtering device (not shown), such as a baghouse, cyclone separator, or wet-wash system.

Due to the inclination and rotation of drum dryer 202, the aggregate materials will be conveyed from conveyor 216 towards lower end 212 of the drum dryer. As the aggregate materials are so conveyed, a plurality of inner mixing flights or paddles 224 mounted on the inner surface of the drum dryer lift and tumble the aggregate materials in the drum dryer as it rotates, thereby enabling a more thorough heating and drying of the aggregate materials as they are passed through the heated gases flowing through the drum dryer. Although drum dryer 202 is of a counter-flow design, it is also contemplated within the scope of the invention that the drum dryer could be of a parallel flow design.

Aggregate outlet chute 226 is provided at the lower end of drum dryer 202 for discharge of dried and heated aggregate materials from the drum dryer into a mixer such as pugmill 204. The pugmill may be mounted directly beneath drum dryer 202, or it may be mounted so as to discharge the heated aggregate materials onto a discharge conveyor (not shown) that is adapted to transport the heated aggegrate materials to pugmill inlet chute 228. It is also preferred that pugmill 204 is mounted with its longitudinal axis 229 oriented at an angle with respect to the horizontal (H) so as to have an upper end 230 and a lower end 231. Heated aggregate materials enter pugmill 204 through inlet chute 228 and are mixed therein with foamed asphalt cement dispensed from foamed asphalt cement nozzle manifold 32 (shown schematically in FIG. 4) comprising a plurality of foamed asphalt cement nozzle assemblies (described in more detail hereinafter). A plurality of paddles 233 are spirally configured about pugmill shaft 234, which is mounted for rotation along longitudinal axis 230. Shaft 234 is driven by motor 236 and chain drive 238 (shown schematically in FIG. 4) in a conventional manner so that the heated aggregate materials entering inlet chute 228 are mixed with foamed asphalt cement and the resulting asphalt concrete mixture is conveyed to upper end 230 for discharge through discharge chute 240. It is also contemplated within the scope of the invention that a rotary drum mixer such as is known to those having ordinary skill in the art to which the invention relates may be substituted for pugmill 204.

Figure 5:
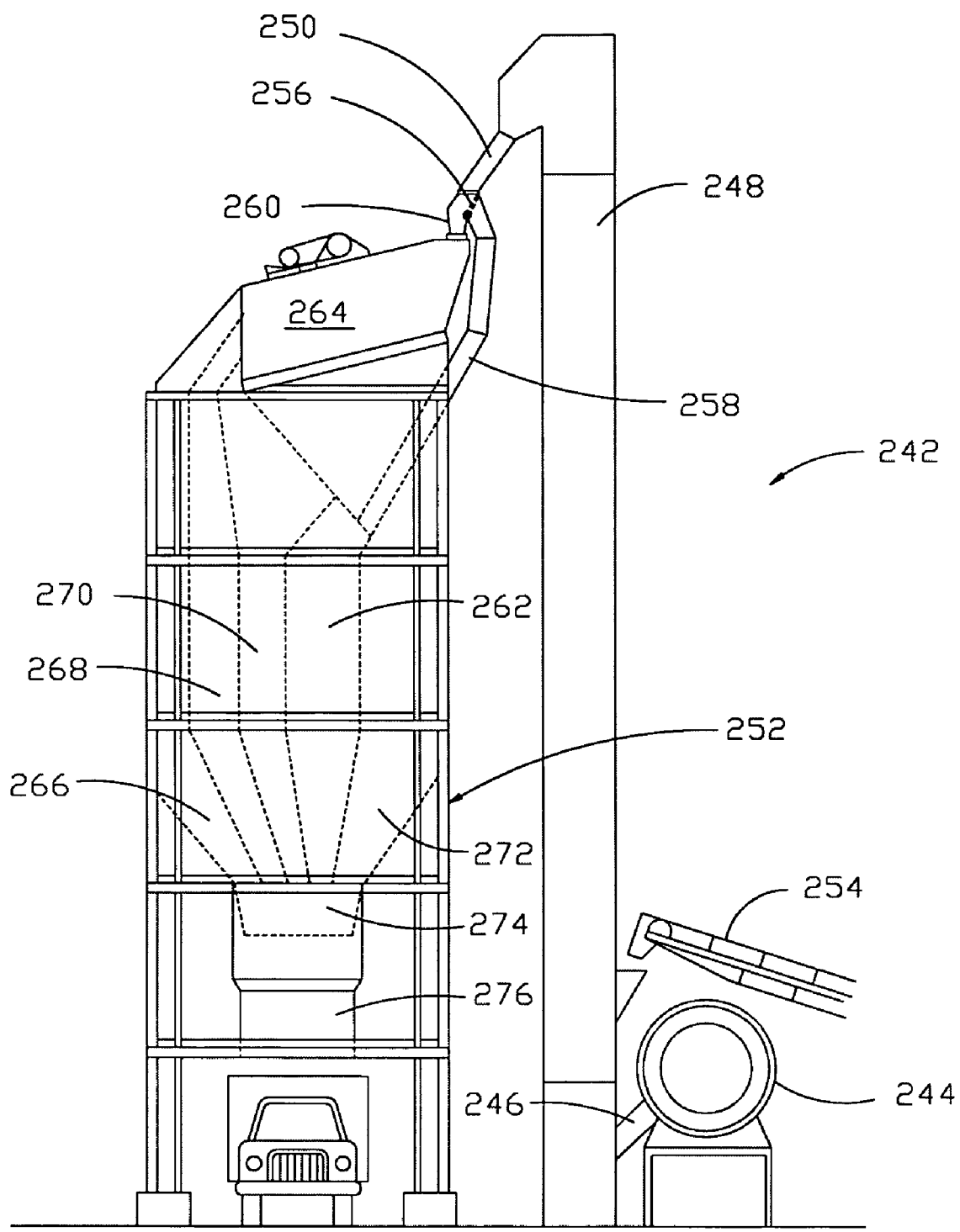
FIG. 5 is a front view of a batch-type asphalt concrete mixer assembly that may be used in connection with a foamed asphalt cement nozzle assembly according to the invention.
Figure 6:
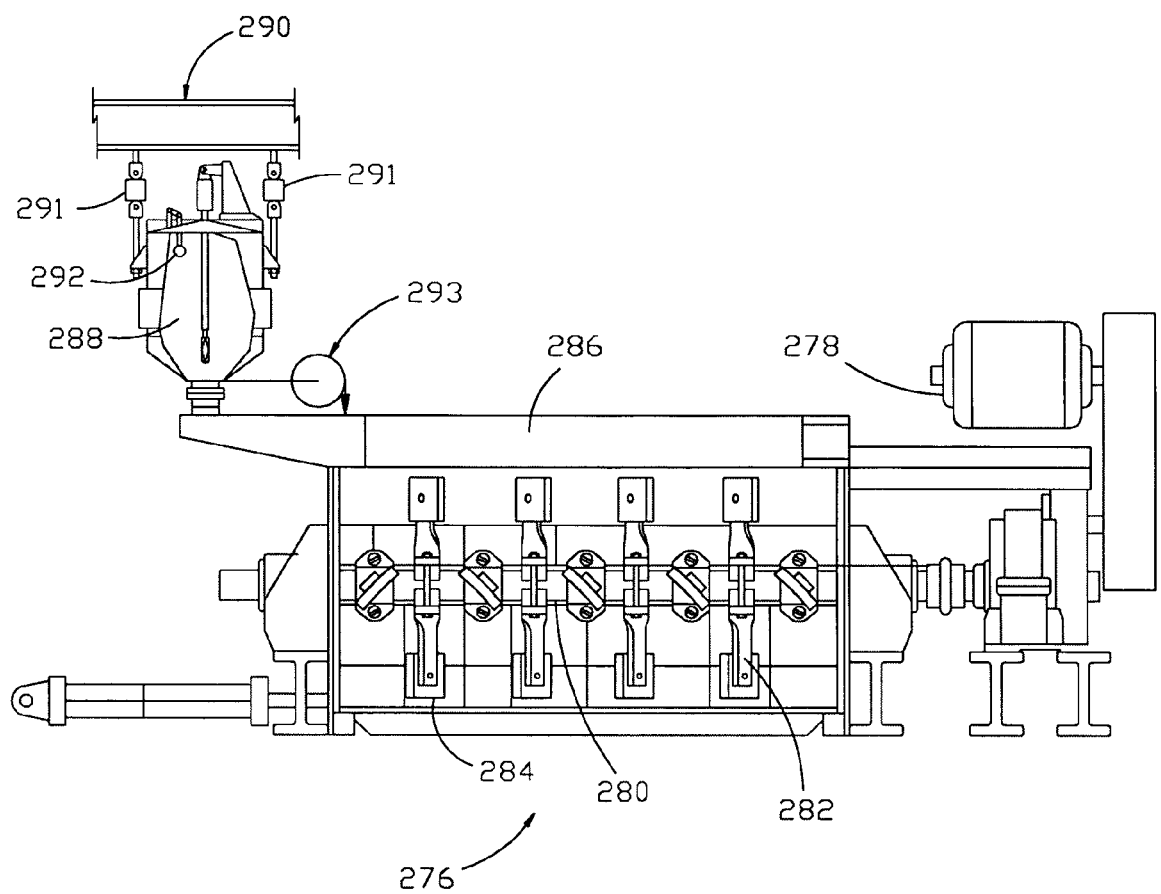
FIG. 6 is a sectional view of a portion of the batch-type asphalt concrete mixer assembly of FIG. 5.

FIGS. 5 and 6 illustrate the use of foamed asphalt cement nozzle manifold 32 in a batch type asphalt mixer. As shown therein, batch plant 242 includes drum dryer 244, which may be of a counter-flow or parallel flow design, for heating and drying aggregate materials. Heated and dried aggregate materials pass out of drum dryer 244 through chute 246 to bucket elevator 248. Elevator 248 conveys the heated aggregate materials upwardly to discharge chute 250, which is located above batch tower 252. Batch plant 242 also includes RAP conveyor 254 for delivering recycled asphalt paving materials into bucket elevator 248. Located at the lower end of discharge chute 250 is gate 256, which selectively directs material into first duct 258 or second duct 260. In this embodiment of the invention, RAP material may be passed through first duct 258 into recycle bin 262, and heated aggregate materials may be passed through second duct 260 into sizing screen 264, where such materials are segregated by particle size into a plurality of heat-insulated aggregate storage bins 266, 268, 270 and 272. A clam shell gate (not shown) is located at the bottom of each bin to control the discharge of material therefrom into weigh hopper 274. The weigh hopper is provided to weigh out predetermined amounts of aggregate materials from bins 266, 268, 270 and 272 and RAP from bin 262 into pugmill 276 (shown in more detail in FIG. 6). Preferably, the pugmill is of a conventional twin-shaft design which is provided to mix foamed asphalt cement with heated aggregate materials and (optionally) RAP.

Referring now to FIG. 6, pugmill 276 includes drive motor 278 and mixing shaft 280, to which are attached a plurality of paddle shanks 282 and paddle tips 284. Mounted atop pugmill 276 is foamed asphalt cement nozzle manifold 286, which includes a plurality of foamed asphalt cement nozzle assemblies (described in more detail hereinafter). An asphalt cement pump (not shown) is provided to supply liquid asphalt cement to weigh bucket 288, which is mounted to support beam 290 by load cells 291. When the load cells indicate that weigh bucket 288 contains a suitable amount of liquid asphalt cement for use in preparing a batch of asphalt concrete according to the invention, float switch 292 is activated to stop the flow of liquid asphalt cement into the weigh bucket. Then after heated and dry aggregate material is dispensed into the pubmill, pump 293 (shown schematically in FIG. 6) is activated to dispense the liquid asphalt cement in the weigh bucket to foamed asphalt cement nozzle manifold 286.

Figure 7:
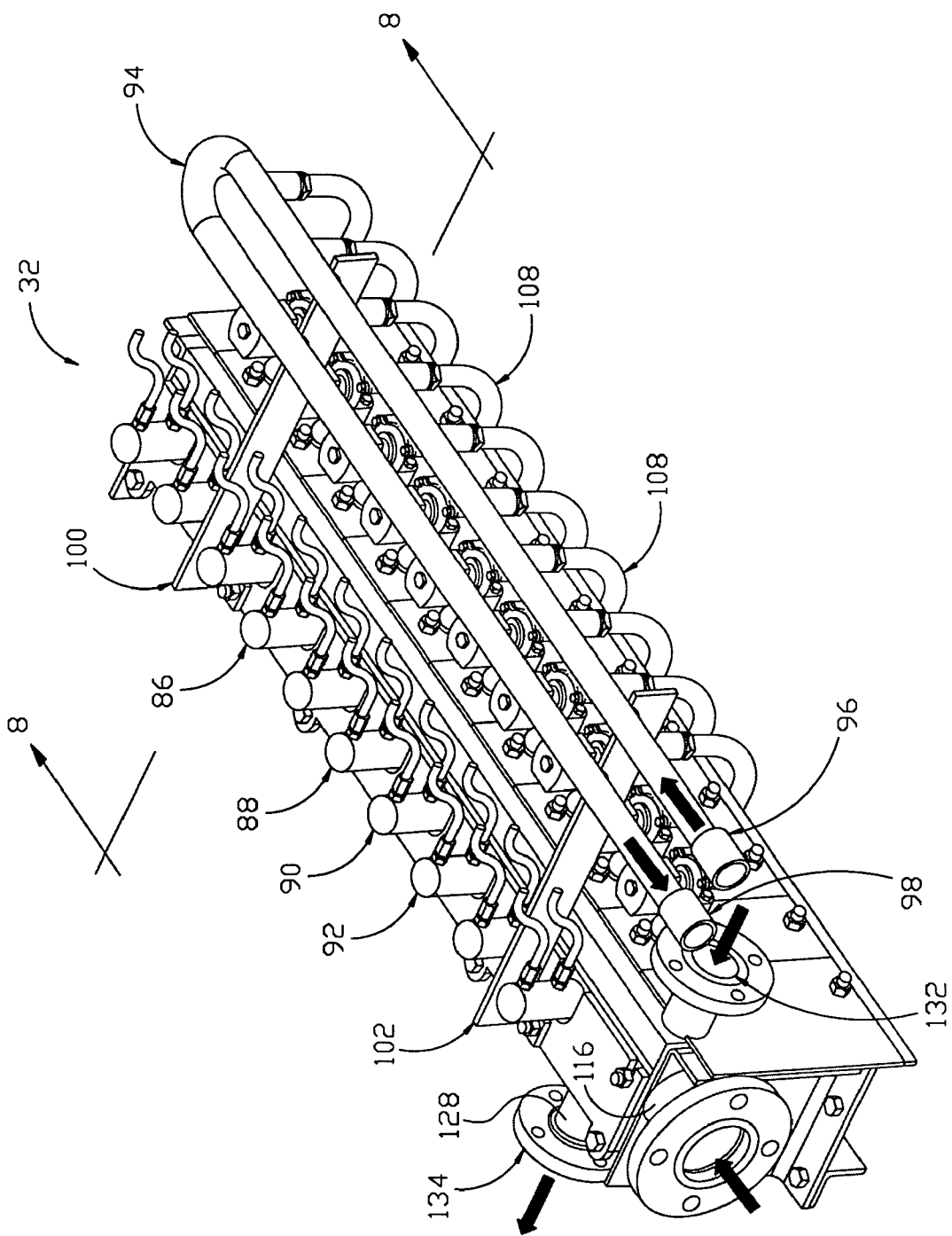
FIG. 7 is a perspective view of a first embodiment of a foamed asphalt cement nozzle manifold according to the invention.
Figure 8:
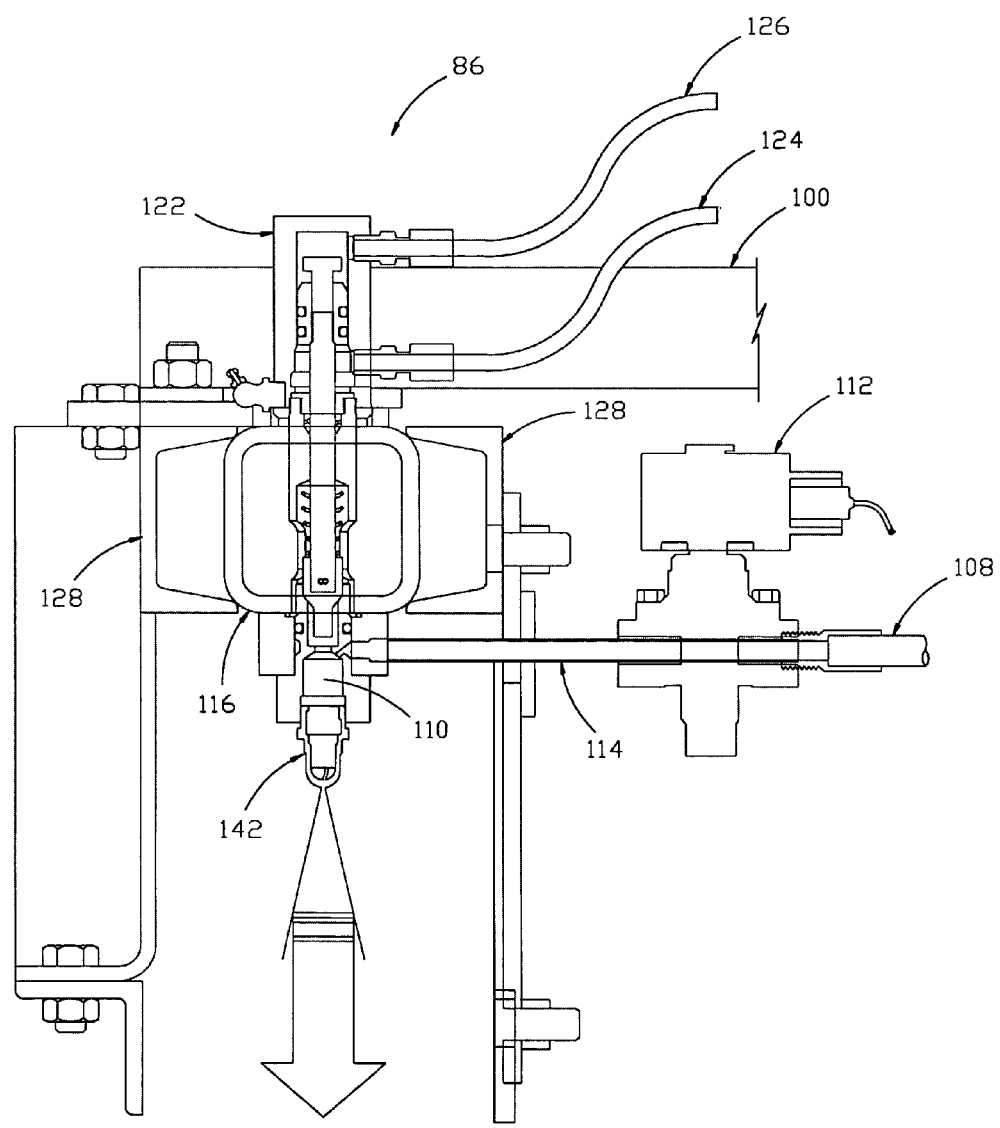
FIG. 8 is a sectional view through nozzle assembly 86 of the asphalt cement nozzle manifold illustrated in FIG. 7, taken through line 8-8 of FIG. 7.
Figure 9:
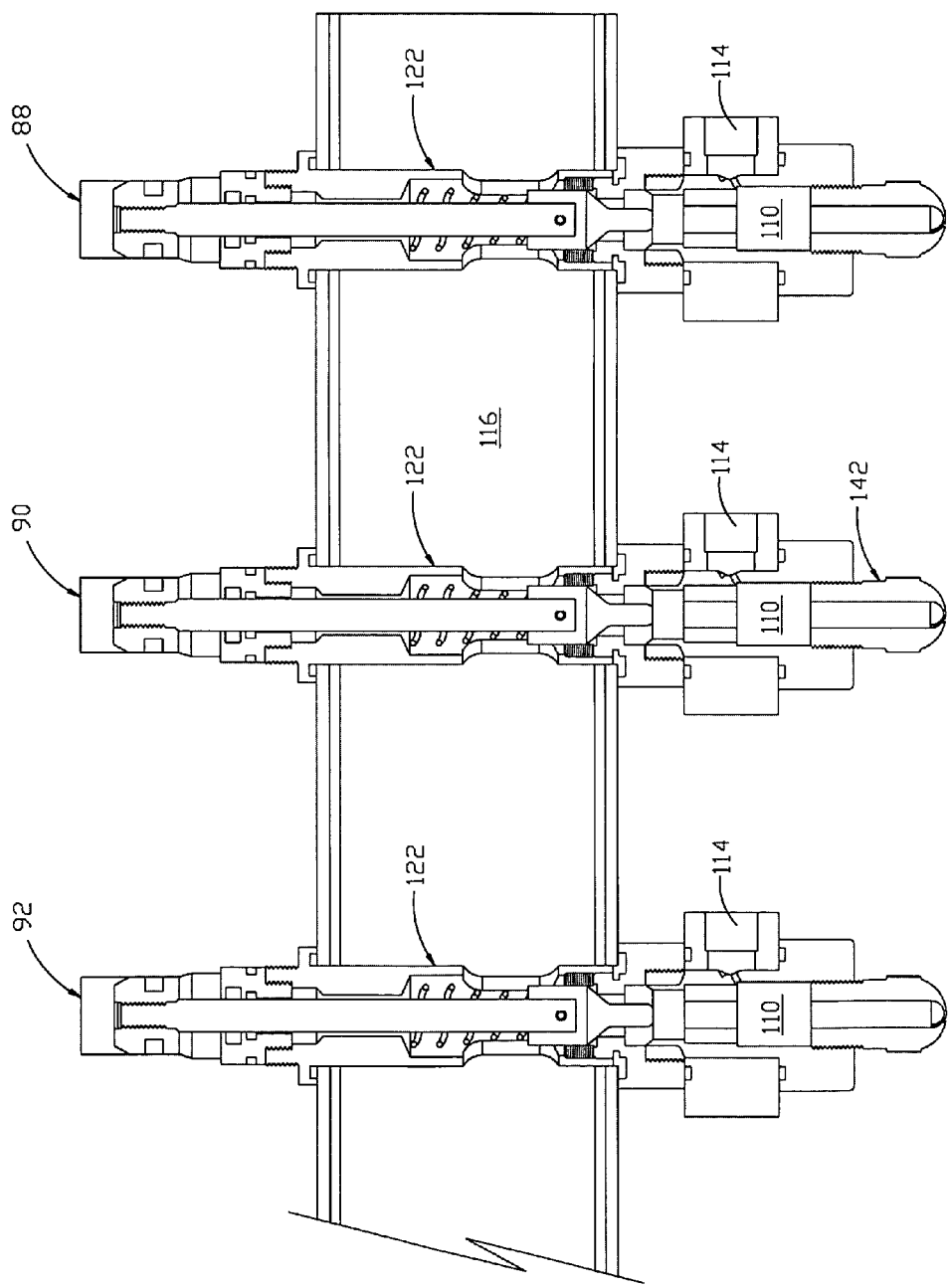
FIG. 9 is a sectional view of asphalt cement nozzle assemblies 88, 90, and 92 of FIG. 7, taken in a direction perpendicular to that of FIG. 8.

FIG. 7 illustrates a preferred embodiment of foamed asphalt cement nozzle manifold 32. This manifold includes ten foamed asphalt cement nozzle assemblies, although a greater or lesser number may be included. Nozzle assembly 86 of FIG. 7 is illustrated in FIG. 8 and nozzle assemblies 88, 90 and 92 are illustrated in FIG. 9. A plurality of nozzle assemblies such as assemblies 86, 88, 90 and 92 may also be employed in nozzle manifold 286 that is associated with pugmill 276 (FIG. 6) in a manner that will be appreciated by those having ordinary skill in the art to which the invention relates.

Figure 13:
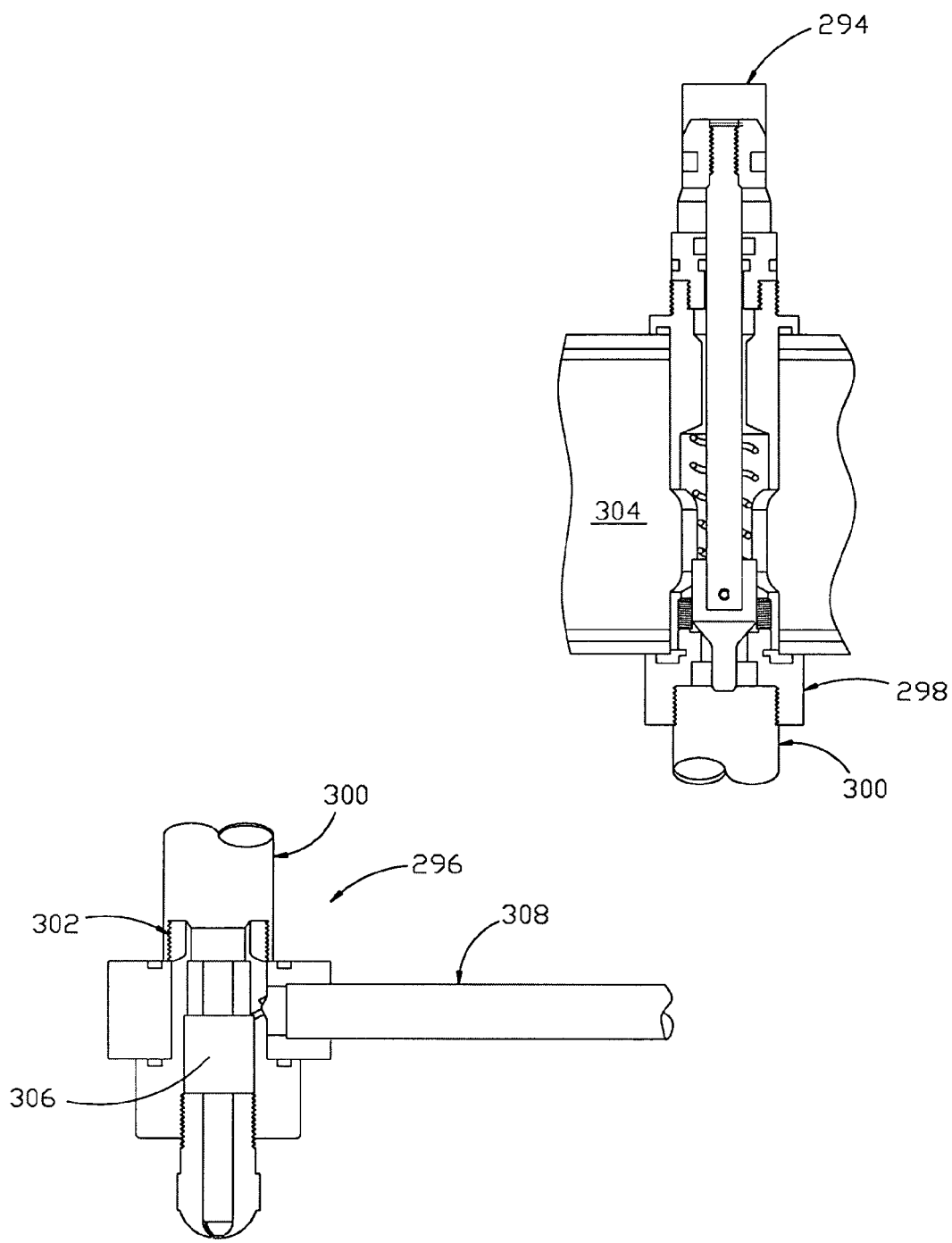
FIG. 13 is a sectional view of a second embodiment of an asphalt cement nozzle assembly for use in connection with the invention.
Figure 14:
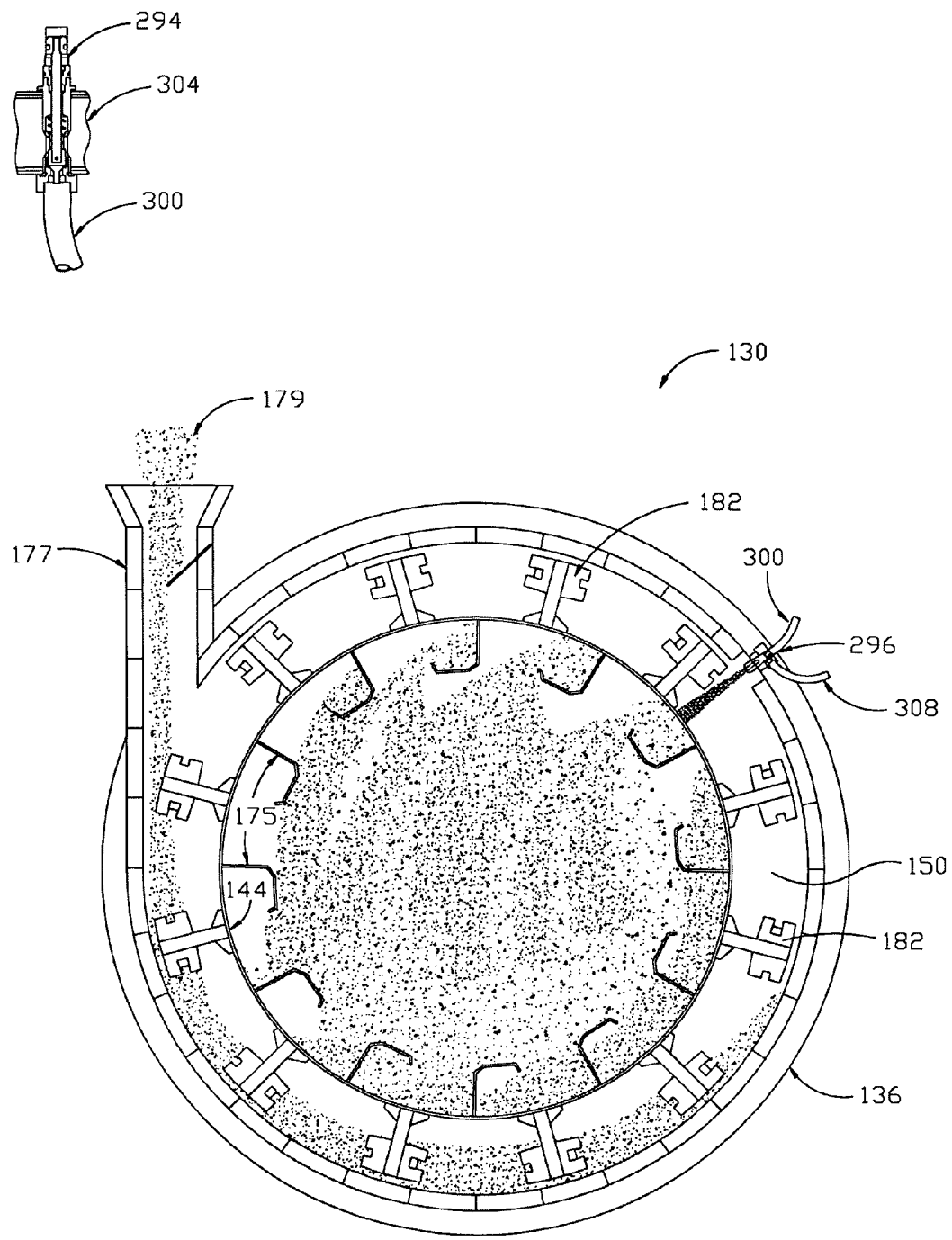
FIG. 14 is a partial sectional view of an alternative embodiment of an asphalt concrete mixer similar to that of FIGS. 1-3, but which includes an inlet for recycled asphalt product and an asphalt cement nozzle assembly such as is illustrated in FIG. 13.

Although shown in FIGS. 1-3 as being mounted on outer drum 36 or in FIG. 4 as being mounted on pugmill 204, foamed asphalt cement nozzle manifold 32 could be located in another location if convenient, and a line from each nozzle assembly could be provided to conduct foamed asphalt cement into a mixer such as mixer 30 or a pugmill such as pugmill 204. Such a remote nozzle assembly is illustrated in FIGS. 13 and 14 and described in more detail hereinafter.

In addition to the nozzle assemblies (of which assemblies 86, 88, 90 and 92 are representative), asphalt cement nozzle manifold 32 includes water manifold 94 (including water inlet 96 and water outlet 98) which is supported by brackets 100 and 102. Water is supplied to water inlet 96 of manifold 94 from water source 104 through pipe 106, both of which are shown schematically in FIG. 3. A pump and one or more valves (not shown) will typically be employed in connection with water source 104 and pipe 106, as is known to those having ordinary skill in the art to which the invention relates. Water from manifold 94 is directed to each of the nozzle assemblies through a nozzle supply line 108. As shown in FIG. 8, each of the nozzle supply lines furnishes water to a foamed cement mixing chamber 110 through valve 112 and inlet line 114.

Asphalt cement nozzle manifold 32 also includes asphalt cement manifold 116 which supplies liquid asphalt cement from asphalt cement source 118 through pipe 120, both of which are shown schematically in FIG. 3. A pump, heater, and one or more valves (not shown) will typically be employed in connection with asphalt cement source 118 and pipe 120, as is known to those having ordinary skill in the art to which the invention relates. It is preferred that liquid asphalt cement be introduced into manifold 116 at a temperature within the range of about 280° F. to about 350° F. Asphalt cement from manifold 116 is preferably directed into foamed asphalt cement mixing chamber 110 by conventional asphalt cement nozzle 122, which is controlled by open air line 124 and close air line 126. It is preferred that foamed AC mixing chamber 110 is adapted to be attached, by threaded engagement or other means, to the conventional asphalt cement nozzle. By providing such construction, the asphalt cement nozzle manifold can include or incorporate one or more conventional liquid asphalt cement nozzle assemblies.

Preferred asphalt cement nozzle manifold 32 includes hot oil manifold 128 which includes hot oil inlet 132 and hot oil outlet 134. Manifold 128 supplies hot oil for maintaining the temperature of the liquid asphalt cement in manifold 116 within the desired range adjacent to conventional nozzle 122 and foamed asphalt cement mixing chamber 110. Hot oil from source 138 (shown schematically in FIG. 3) is conducted through pipe 140 (also shown schematically) to hot oil manifold 128. A heater, a pump and one or more valves (not shown) will typically be employed in connection with hot oil source 138 and pipe 140, as is known to those having ordinary skill in the art to which the invention relates. In the alternative, heat for the asphalt cement manifold can be provided by electrical heating elements (not shown) or by other means known to those having ordinary skill in the art to which the invention relates.

It is preferred that, when asphalt cement nozzle 122 is actuated, liquid asphalt cement is introduced into foamed cement mixing chamber 110 at an AC rate within the range of about 8.5 gallons/minute to about 180 gallons/minute, depending on the production rate of the asphalt mixer with which asphalt cement nozzle manifold 32 is associated. Such AC rate allows the provision of asphalt cement foam according to the invention sufficient to produce up to 50 tons/hour of asphalt concrete. Consequently, when all ten foamed asphalt cement nozzle assemblies are in operation in a mixer such as is shown in FIGS. 1-3, sufficient foamed asphalt cement can readily be generated to produce 500 tons/hour of asphalt concrete.

Figure 10:
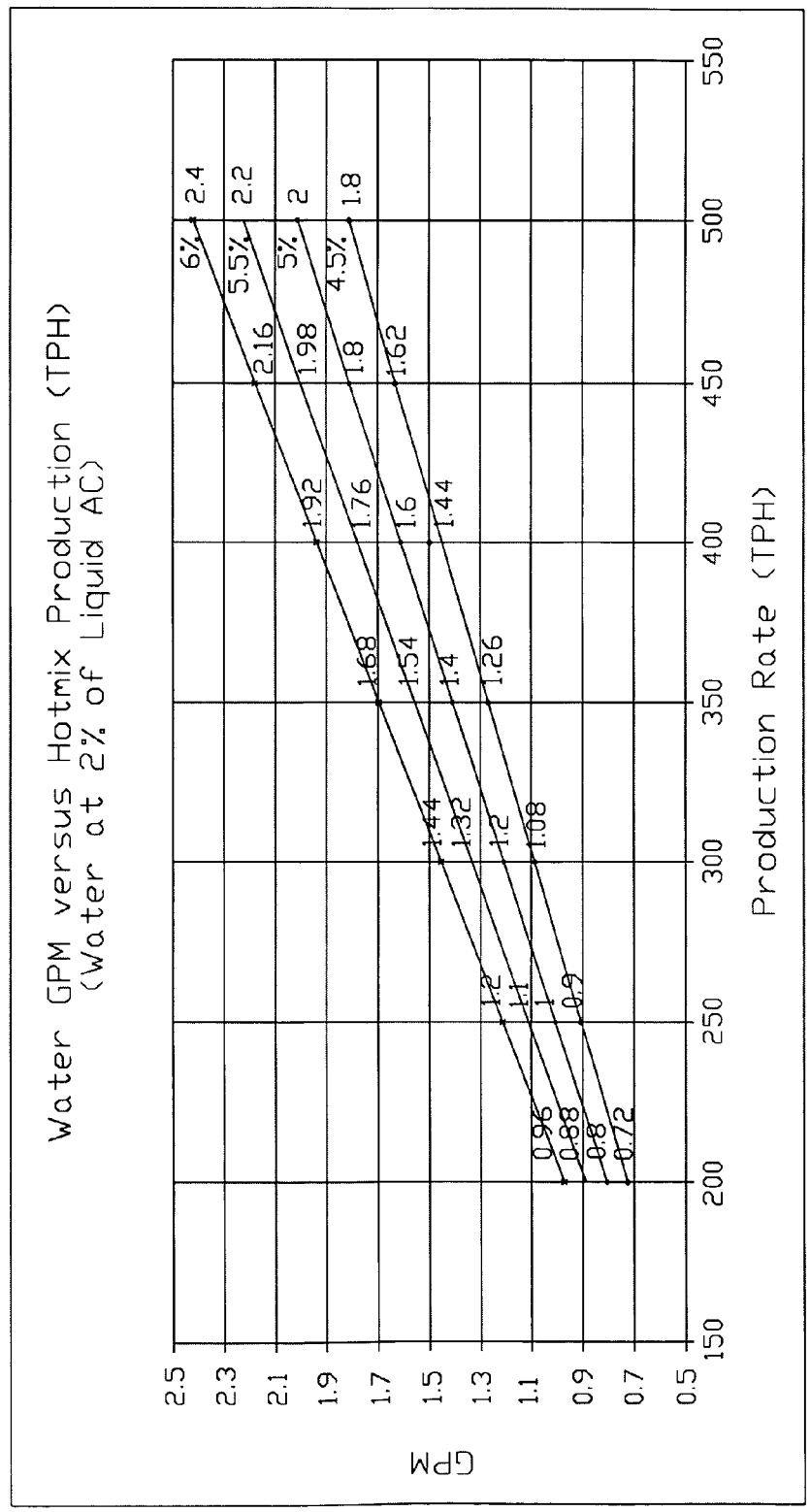
FIG. 10 is a graph showing the relationship between the $H_2O$ rate and the production rate of an asphalt concrete mixer operated according to a preferred embodiment of the invention to produce products having varying amounts of asphalt cement.

In the operation of asphalt cement nozzle manifold 32, water and liquid asphalt cement are simultaneously introduced into foamed cement mixing chamber 110. Preferably, water is introduced into foamed AC mixing chamber 110 at an $H_2O$ rate which is about 0.6% to about 2.0% of the AC rate at which asphalt cement in introduced. FIG. 10 illustrates various $H_2O$ rates (Y-axis) when water is introduced at 2.0% of the AC rate, depending on the asphalt concrete production rate (X-axis) and the amount of asphalt cement in the asphalt concrete product. The top line indicates various $H_2O$ rates at various production rates when the asphalt cement content of the product is 6.0%. The second line from the top indicates various $H_2O$ rates at various production rates when the asphalt cement content of the product is 5.5%. The third line from the top indicates various $H_2O$ rates at various production rates when the asphalt cement content of the product is 5.0%. The bottom line indicates various $H_2O$ rates at various production rates when the asphalt cement content of the product is 4.5%.

Water is introduced into the foamed asphalt cement mixing chamber at ambient or tap temperature, although it may be chilled prior to introduction thereto. Upon mixing of the liquid asphalt cement at a temperature within the range of about 280° F. to about 350° F. with the much cooler water, the liquid asphalt cement will expand to produce foamed asphalt cement at outlet nozzle 142 (shown in FIG. 8), preferably at a temperature that is no higher than 285° F., and generally within the range of about 230° F. to about 270° F. Because hard asphalt cements, such as those having a penetration within the range of about 40 dmm to about 100 dmm (when measured according to ASTM D5 at 25° C.), include light oil components having a boiling point above 285° F., such asphalt cements may be employed in connection with the invention without risk that the light oil components will vaporize (thereby generating blue smoke) during production of asphalt cement.

Figure 11:
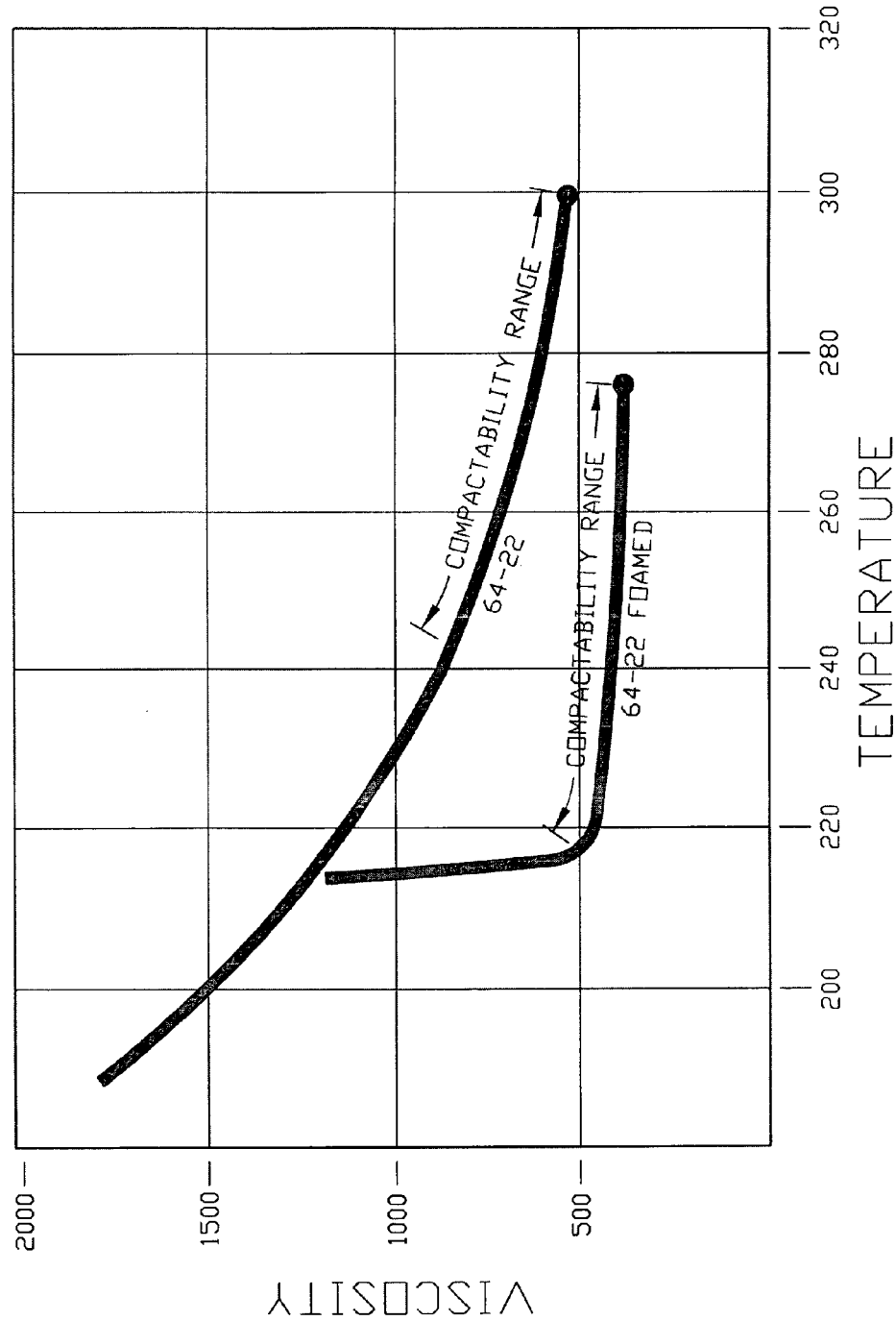
FIG. 11 is a graph showing the relationship between viscosity and compacting temperature of foamed asphalt cement according to a preferred embodiment of the invention for a particular asphalt cement formulation, as well as the relationship between viscosity and compacting temperature of liquid asphalt cement of the same formulation.
Figure 12:
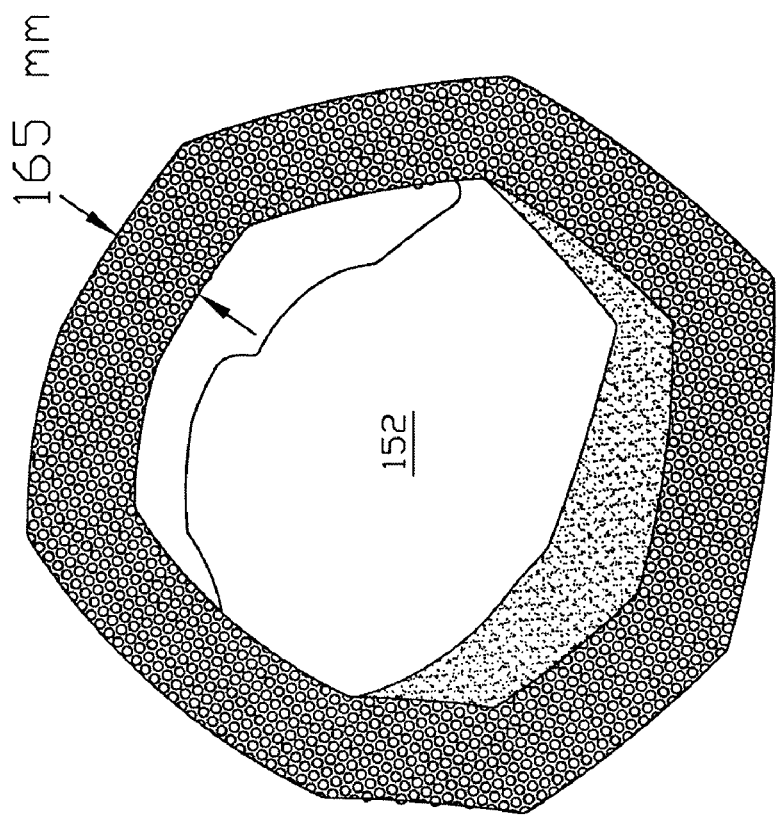
FIG. 12 is an illustration comparing the coating thickness of liquid asphalt cement and foamed asphalt cement prepared according to a preferred embodiment of the invention.
Figure 12:
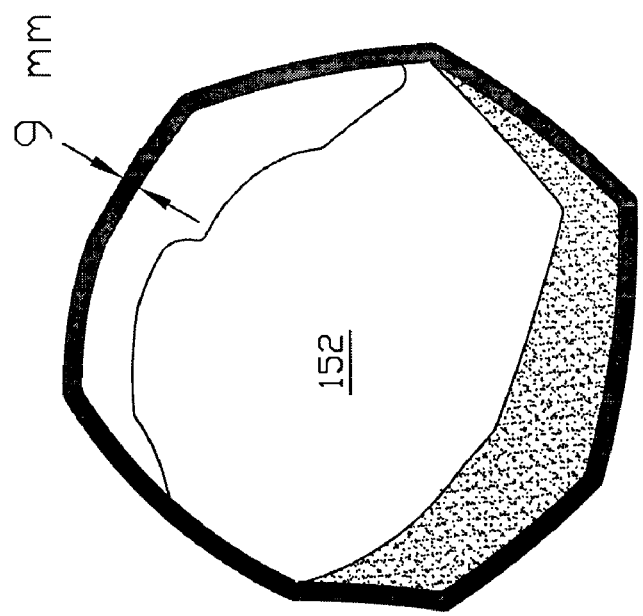

When foamed asphalt cement is employed in the production of asphalt concrete according to the invention, the viscosity of the asphalt cement component of the asphalt concrete product will be reduced from what it would be if the same asphalt cement were employed as a liquid. In addition, the temperatures at which the asphalt concrete product may be compacted, and hence the temperatures at which it may be applied in building or repairing a road surface, will be significantly reduced. FIG. 11 compares the performance of a typical hard asphalt cement in conventional asphalt concrete production (top line) with the performance of the same asphalt cement when foamed and used according to the invention (bottom line). The asphalt cement used in this comparison is PG64-22, a hard asphalt cement which has typical penetration values within the range of 60-70 dmm. When this asphalt cement is used in liquid form in the production of asphalt concrete, the higher viscosity requires higher temperatures for compaction. As shown in FIG. 11 (top line), the use of PG64-22 in liquid form in a conventional process produces a product that may be applied and compacted at temperatures within the range of about 245° F. to about 300° F. When, on the other hand, this same asphalt cement is foamed for use according to the method of the invention (bottom line), the lower viscosity permits application and compaction of the resulting product at temperatures within the range of about 220° F. to about 275° F. FIG. 12 illustrates the difference in viscosity (and the corresponding difference in compaction) between a typical piece 152 of aggregate material coated with liquid PG64-22 according to a conventional process and that same typical piece of aggregate material coated with foamed PG64-22 according to the invention. As shown therein, the foamed asphalt cement coating contains many steam bubbles created in the foaming process, thereby producing a typical coating thickness on the typical piece 152 of aggregate material of 165 mm. The same asphalt cement used in a conventional process will produce a typical coating thickness of only 9 mm. Since most of the heat in the asphalt concrete product is obtained from heating the aggregate materials in the mixer, the use of foamed asphalt cement according to the invention permits a reduction in the heat that must be transferred to the aggregate materials. Applicant has found that by reducing the temperature to which the aggregate materials are heated in the mixer by about 50° F., the amount of fuel required for such heating can be reduced by about 11%.

In addition, as mentioned above, oxidation is a common problem encountered when asphalt concrete is made with recycled asphalt product. Furthermore, because the asphalt cement in recycled asphalt product is already in solid form, it is generally necessary to employ soft asphalt cements in a conventional asphalt concrete production process where recycled asphalt product is used as a portion of the raw material in order to obtain suitable compaction. However, Applicant has found that by crushing the recycled product to a gradation similar to that of the virgin aggregate materials used in the product and by foaming a hard asphalt cement according to the invention, recycled asphalt product can be used in an amount by weight equal to that of the virgin aggregate materials according to the invention, and the resulting product can be compacted satisfactorily at temperatures 50° F. or more lower than are required for a product made according to conventional methods.

FIG. 13 illustrates a foamed asphalt cement nozzle assembly that comprises two components, one of which is located remotely from the other, for use in connection with a mixer such as mixer 30, pugmill 204 or pugmill 276. As shown therein, the remote nozzle assembly includes liquid asphalt nozzle assembly 294 and foamed asphalt cement nozzle assembly 296. As shown in FIG. 14, for example, liquid AC nozzle assembly 294 may be located a convenient distance from asphalt concrete mixer 130 (described in more detail hereinafter), to which the foamed AC nozzle assembly 296 is attached. Liquid AC nozzle assembly 294 is threaded at its outlet end 298 to receive one end of connector pipe 300, and the other end of the connector pipe is attached to inlet end 302 of foamed AC nozzle assembly 296 in a similar manner. Of course, a plurality of liquid asphalt nozzle assemblies 294 could be aggregated in a manifold (not shown) and connected by a plurality of connector pipes to a like number of foamed AC nozzle assemblies mounted on or adjacent to a mixer.

Liquid AC nozzle assembly 294 is substantially similar to conventional asphalt cement nozzle 122 of the embodiment illustrated in FIG. 9. Assembly 294 is attached to liquid asphalt cement manifold 304, which is substantially similar to liquid asphalt cement manifold 116 of the embodiment illustrated in FIG. 9. Foamed AC nozzle assembly 296 includes a foamed cement mixing chamber 306, which is substantially similar to mixing chamber 110 of the embodiment illustrated in FIGS. 8 and 9. Liquid AC is introduced through pipe 300 to foamed cement mixing chamber 306, and water is introduced through water inlet line 308, which is substantially similar to inlet line 114 of the embodiment illustrated in FIGS. 8 and 9. In the operation of asphalt cement nozzle 296, water and liquid asphalt cement are simultaneously introduced into foamed cement mixing chamber 306. Preferably, water is introduced into foamed cement mixing chamber 306 at an $H_2O$ rate which is about 0.6% to about 2.0% of the AC rate at which asphalt cement in introduced.

As shown in FIG. 14, foamed AC nozzle assembly 296 is adapted to be mounted so as to dispense foamed asphalt cement into the annular mixing chamber of an embodiment of an asphalt concrete mixer that is similar to that of FIGS. 1-3. As shown in FIG. 14, asphalt concrete mixer 130 includes a generally cylindrical fixed outer drum 136 having a longitudinal axis (not shown) that is inclined with respect to the horizontal so that the outer drum has an upper end (not shown, but substantially similar to upper end 40 of outer drum 36) and a lower end (also not shown, but substantially similar to lower end 42 of outer drum 36). The longitudinal axis of outer drum 136 is coincident with that of generally cylindrical inner drum 144, so that the inner drum also has an upper end (not shown, but substantially similar to upper end 46 of inner drum 44) and a lower end (also not shown, but substantially similar to lower end 48 of inner drum 44). Outer drum 136 has a diameter that is greater than the diameter of inner drum 144, and consequently, an annular mixing chamber 150 is provided between the outer drum and the inner drum. Outer drum 136 is fixedly mounted to a frame (not shown, but substantially similar to frame 12 of mixer 30) and encircles at least a portion of inner drum 144. The inner drum is rotatably mounted on the frame and adapted to be rotated with respect to the fixed outer drum in a conventional manner.

Asphalt concrete mixer 130 also includes a burner (not shown but substantially similar to burner 64 of mixer 30) at the lower end of the inner drum which is adapted to heat and dry the aggregate material within the inner drum. An inlet (not shown, but substantially similar to inlet 72 of inner drum 44) for aggregate materials is provided at the upper end of the inner drum 144. Due to the inclination and rotation of the inner drum, the aggregate materials will be conveyed from the inlet towards the lower end of the drum. As the aggregate materials are so conveyed, a plurality of inner mixing flights or paddles 175 mounted on the inner surface of the inner drum lift and tumble the aggregate materials in the inner drum as it rotates with respect to the outer drum, thereby enabling a more thorough heating and drying of the aggregate materials as they are passed through the heated air flowing through the drum. An exhaust fan (not shown) may also be employed in combination with the burner to direct a flow of heated air from the lower end of inner drum 144, through the drum, and out the upper end. Inner drum 144 is provided with an outlet (not shown, but substantially similar to outlet 80 of inner drum 44) at or near its lower end for discharge of heated aggregate materials into annular mixing chamber 150. In addition to the inlet for aggregate materials, mixer 130 includes inlet 177 for introducing recycled asphalt product 179 into the annular mixing chamber. Also in fluid communication with annular mixing chamber 150, as described above, is foamed asphalt cement nozzle assembly 296 which is adapted to introduce foamed asphalt cement into the annular mixing chamber according to the invention. A plurality of paddle-like outer mixing flights or blades 182 are mounted to the outer surface of inner drum 144 within outer drum 136. These outer mixing flights are arranged so that, as drum 144 rotates, the mixing flights span substantially the whole distance between the outer surface of inner drum 144 and the inner surface of outer drum 136. Outer mixing flights 182 are also preferably angled in such a manner that in addition to mixing the aggregate materials, recycled asphalt product and foamed asphalt cement in the mixing chamber, the flights convey the resulting asphalt concrete mixture to an outlet of the annular mixing chamber (not shown but substantially similar to outlet 84 of mixer 30) that is provided through the outer drum at or near its upper end. The asphalt concrete paving material may then be discharged from annular mixing chamber 150 through this outer drum outlet.

Because inner drum 144 is preferably constructed of heat-conductive material, heat produced by the burner is transferred from inside the inner drum to annular mixing chamber 150. It is preferred that the temperature within the annular mixing chamber be at least as high as the boiling point of water but no higher than about 285° F. during mixing of the foamed asphalt cement with the aggregate materials.

Recycled asphalt product typically contains about from 2 to 5% by weight moisture, so that when asphalt concrete mixer 130 is operated according to the invention, steam will be produced in the annular mixing chamber as the recycled asphalt product is heated by the transfer of heat from inner drum 144 to the annular mixing chamber. This steam will create an inert atmosphere in the annular mixing chamber, thereby reducing the risk of oxidation of the asphalt concrete product.

Figure 15:
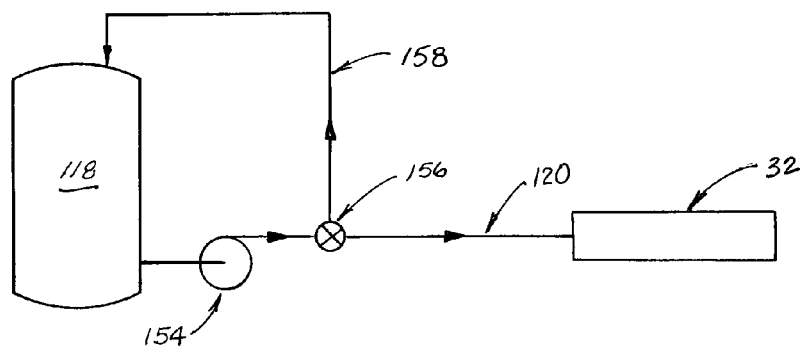
FIG. 15 is a schematic illustration of a first embodiment of a fluid circuit for liquid asphalt cement showing the flow of liquid asphalt cement from a source to a foamed asphalt cement nozzle manifold.
Figure 16:
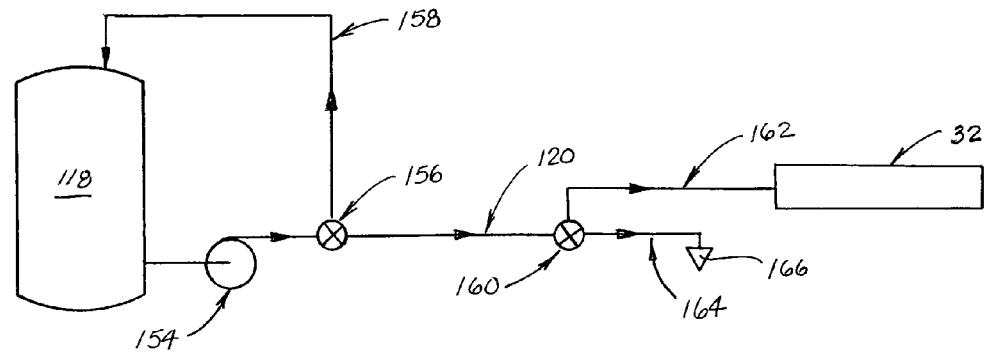
FIG. 16 is a schematic illustration of a second embodiment of a fluid circuit for liquid asphalt cement showing the flow of liquid asphalt cement from a source to a foamed asphalt cement nozzle manifold.
Figure 17:
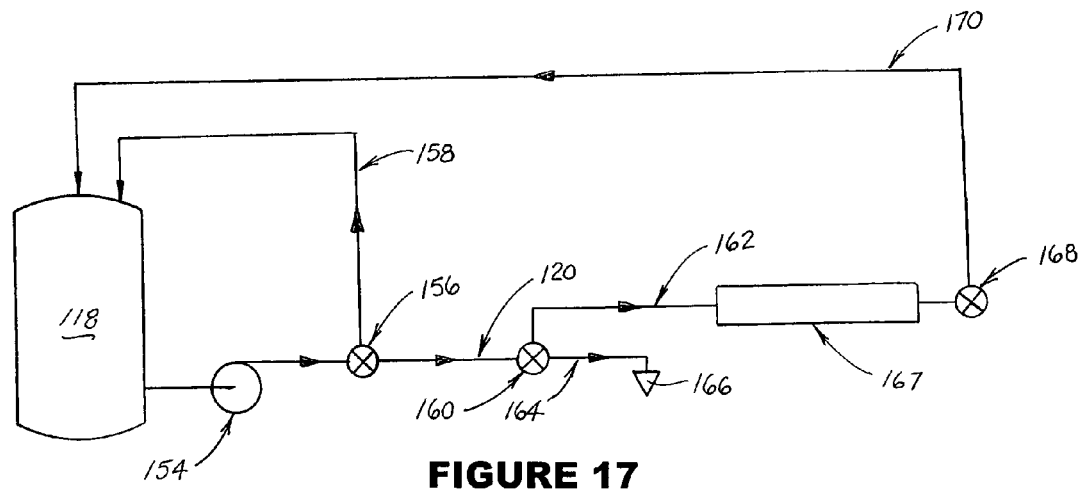
FIG. 17 is a schematic illustration of a third embodiment of a fluid circuit for liquid asphalt cement showing the flow of liquid asphalt cement from a source to a foamed asphalt cement nozzle manifold.

FIGS. 15-17 comprise schematic illustrations of three alternative embodiments of a fluid circuit for liquid asphalt cement showing the flow of liquid asphalt cement from source 118 to a foamed asphalt cement nozzle manifold. As shown in FIG. 15, liquid asphalt cement can be pumped by pump 154 through valve 156 and line 120 to foamed asphalt cement nozzle manifold 32, or it can be directed by valve 156 to return line 158 and back to source 118. FIG. 16 illustrates a modified version of the asphalt cement fluid circuit of FIG. 15. As shown therein, liquid asphalt cement can be pumped by pump 154 through valve 156 and line 120 to valve 160, where it may be directed through line 162 to foamed asphalt cement nozzle manifold 32 or through line 164 to conventional liquid asphalt cement nozzle assembly 166. Also, as shown in FIG. 16, valve 156 can be employed to direct the liquid asphalt cement to return line 158 and back to source 118. FIG. 17 illustrates still another embodiment of an asphalt cement fluid circuit. As shown therein, asphalt cement nozzle manifold 167 differs from manifold 32 in that it has both a liquid asphalt cement inlet and a liquid asphalt cement outlet. Thus, as shown in FIG. 17, liquid asphalt cement can be pumped by pump 154 through valve 156 and line 120 to valve 160, where it may be directed through line 162 to foamed asphalt cement nozzle manifold 167 or through line 164 to conventional liquid asphalt cement nozzle assembly 166. If liquid asphalt cement is directed to foamed asphalt cement nozzle manifold 167 and valve 168 is opened, liquid asphalt cement can pass out the liquid asphalt cement outlet through line 170 for return to source 118. Also in this embodiment of the fluid circuit, valve 156 can be employed to direct the liquid asphalt cement from pump 154 to return line 158 and back to source 118.

Figure 18:
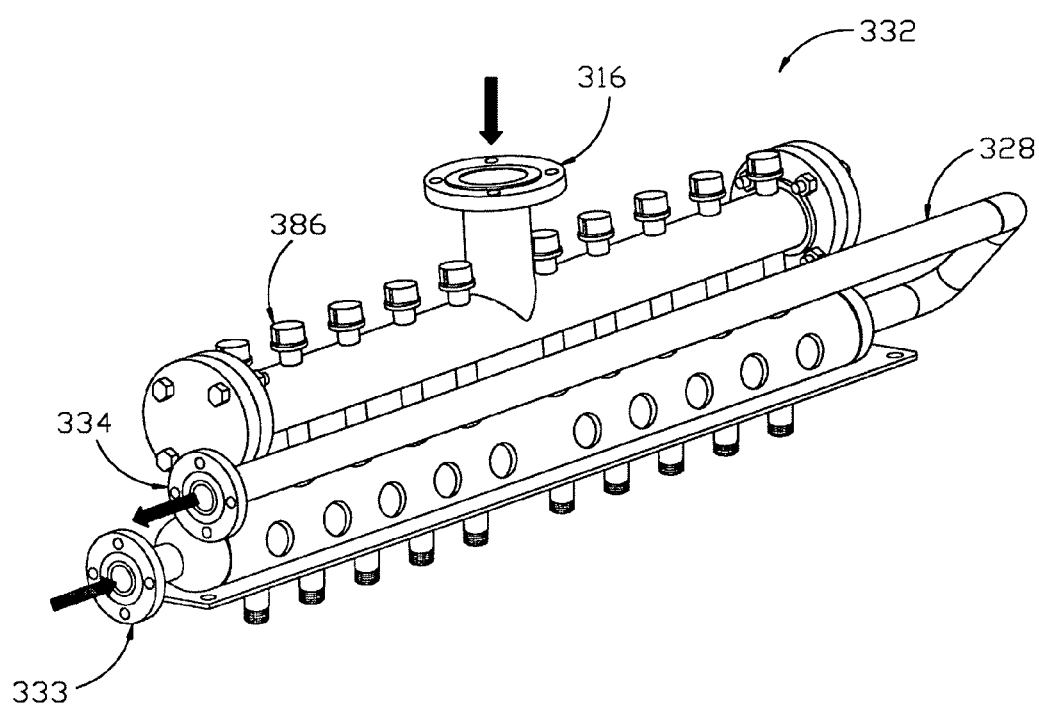
FIG. 18 is a perspective view of a second embodiment of a foamed asphalt cement nozzle manifold of the invention.
Figure 19:
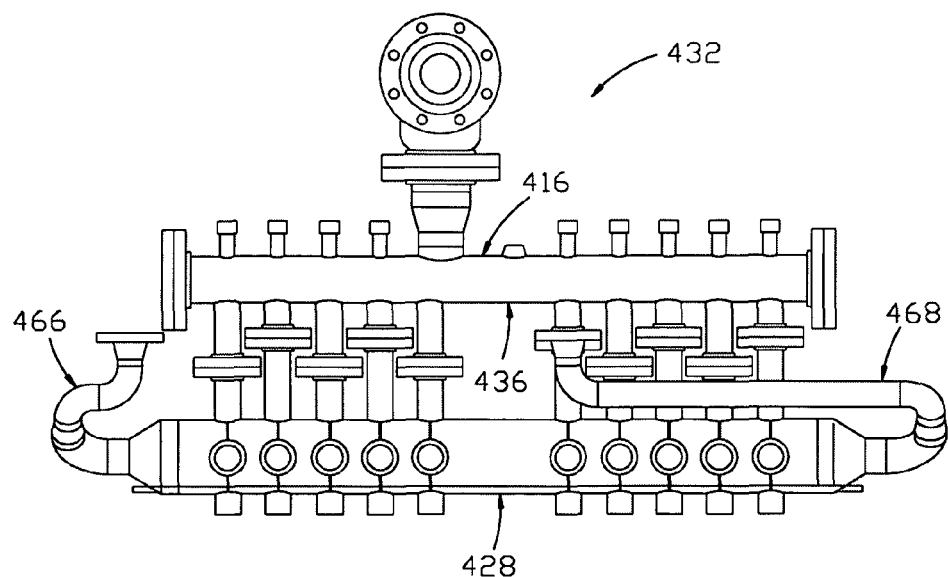
FIG. 19 is a front view of a third embodiment of a foamed asphalt cement nozzle manifold of the invention.
Figure 21:
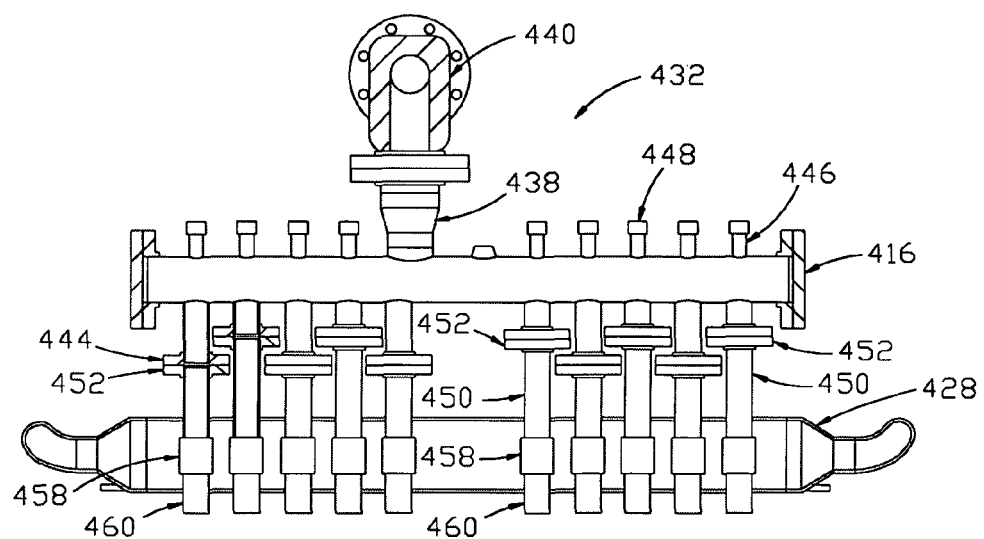
FIG. 21 is a sectional view taken through the line 21-21 of FIG. 20.

Two additional embodiments of an asphalt cement nozzle manifold that may be employed in the practice of the invention are illustrated in FIGS. 18-31. As shown in FIG. 18, foamed asphalt cement nozzle manifold 332 comprises asphalt cement manifold 316, hot oil manifold 328 (including inlet 333 and outlet 334) and ten foamed asphalt cement nozzle assemblies 386. Preferably, nozzle assemblies 386 are substantially similar to nozzle assembly 86 (best shown in FIG. 8).

Another embodiment of the foamed asphalt cement nozzle manifold of the invention is shown in FIGS. 19-31. As shown therein, foamed asphalt cement nozzle manifold 432 includes asphalt cement manifold 416 and hot oil manifold 428. Manifold 416 includes elongated chamber 436 to which is attached asphalt cement inlet 438 and control valve 440 (not shown in FIGS. 24-26). In the embodiment of the invention illustrated in FIGS. 19-23, control valve 440 may be employed to allow asphalt cement from a conventional source to enter manifold 416 or to bypass the manifold and enter an associated asphalt mixer (not shown) in a conventional manner.

Figure 24:
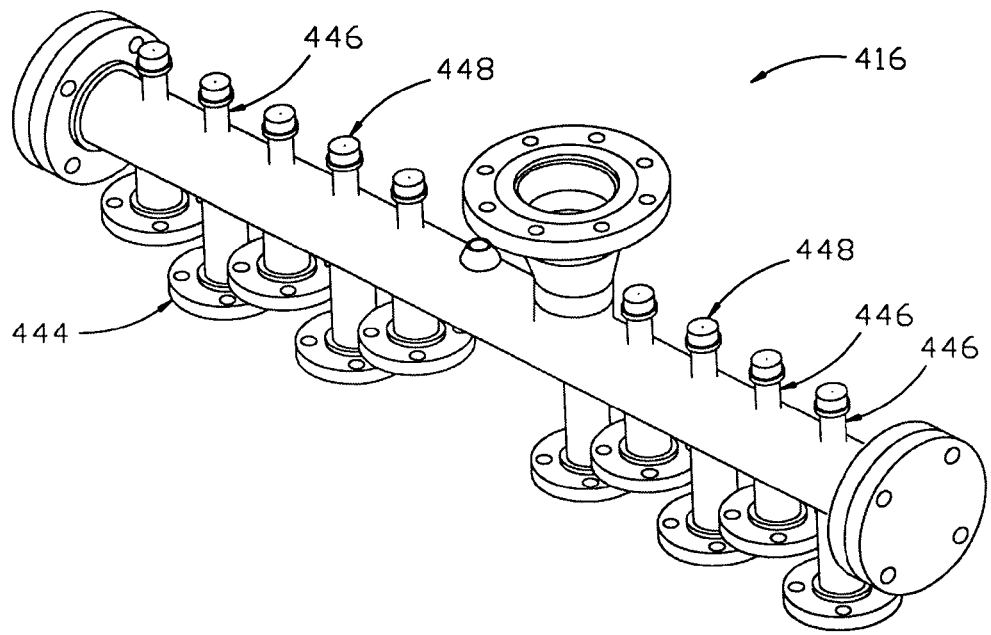
FIG. 24 is a perspective view of a portion of the liquid asphalt cement manifold of the foamed asphalt cement nozzle manifold shown in FIGS. 19-23.
Figure 20:
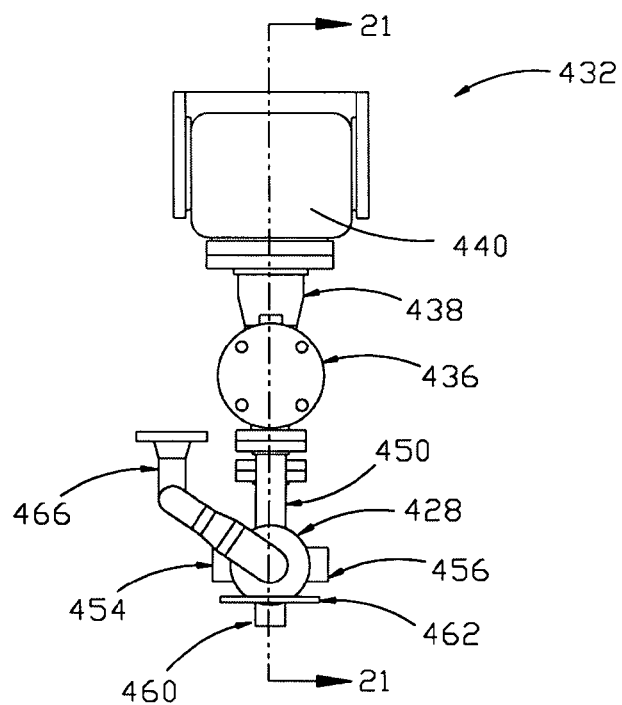
FIG. 20 is a side view of the embodiment of the foamed asphalt cement nozzle manifold shown in FIG. 19.
Figure 22:
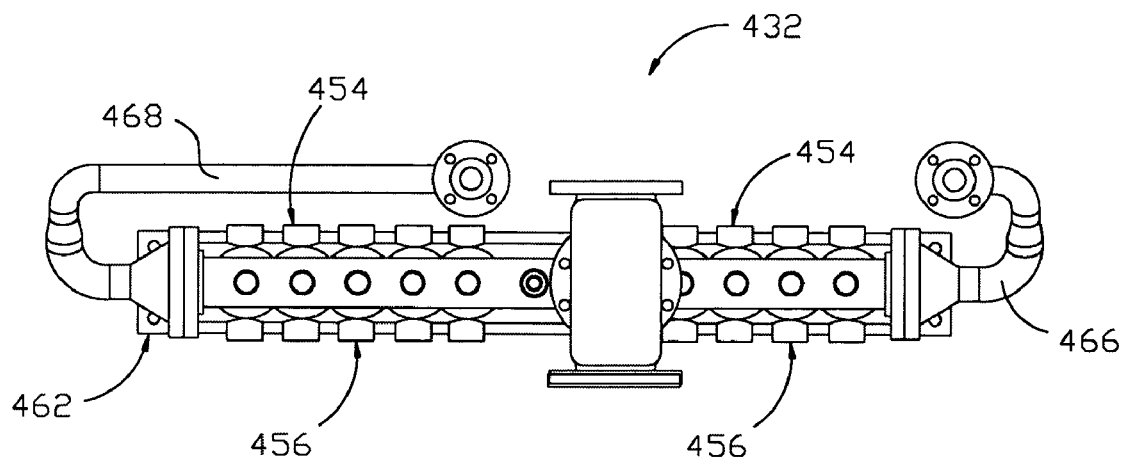
FIG. 22 is a top view of the embodiment of the foamed asphalt cement nozzle manifold shown in FIGS. 19-21.
Figure 23:
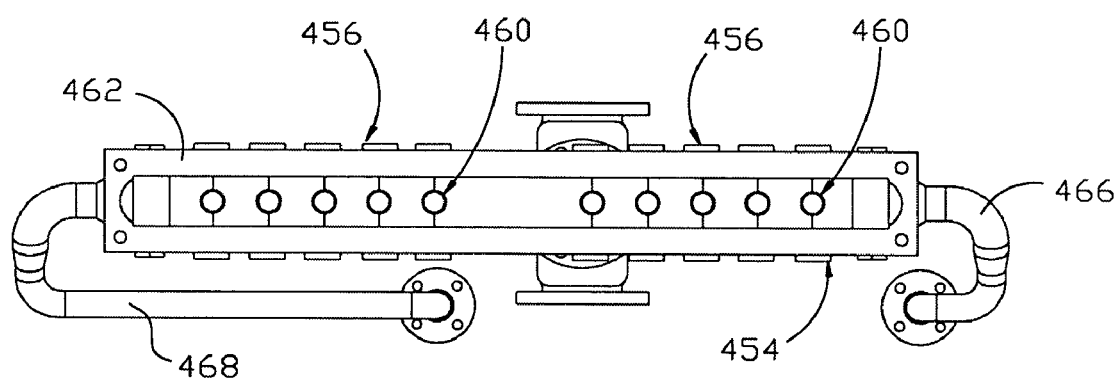
FIG. 23 is a bottom view of the embodiment of the foamed asphalt cement nozzle manifold shown in FIGS. 19-22.
Figure 25:
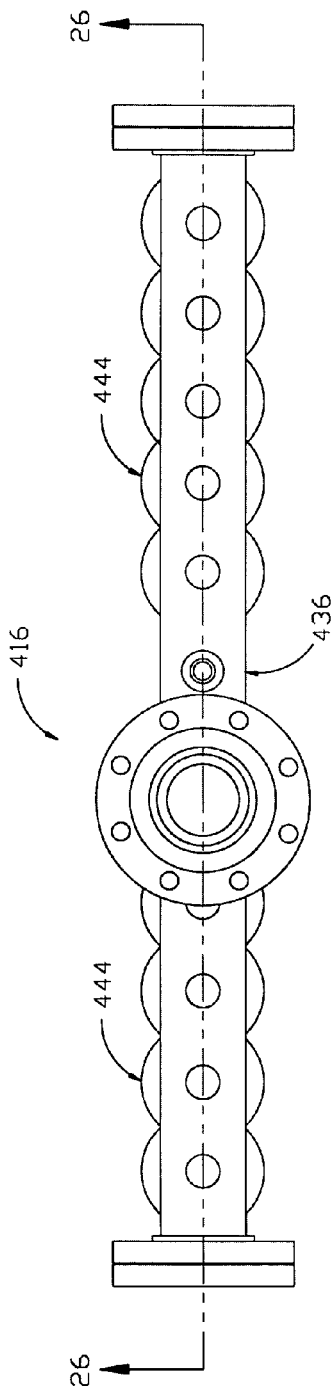
FIG. 25 is a top view of the portion of the liquid asphalt cement manifold shown in FIG. 24.
Figure 26:
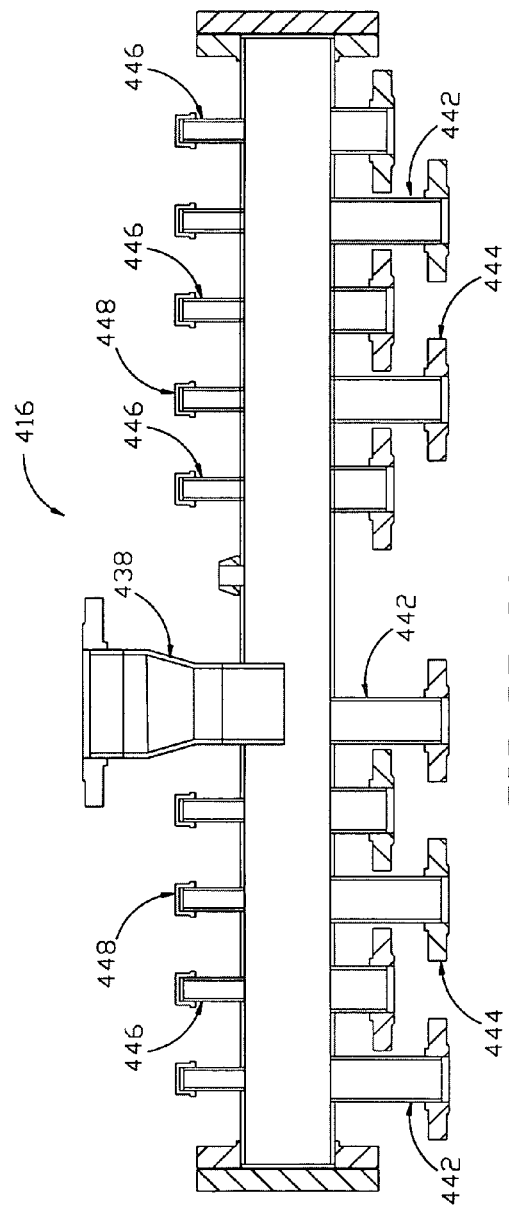
FIG. 26 is a sectional view taken through the line 26-26 of FIG. 25.
Figure 27:
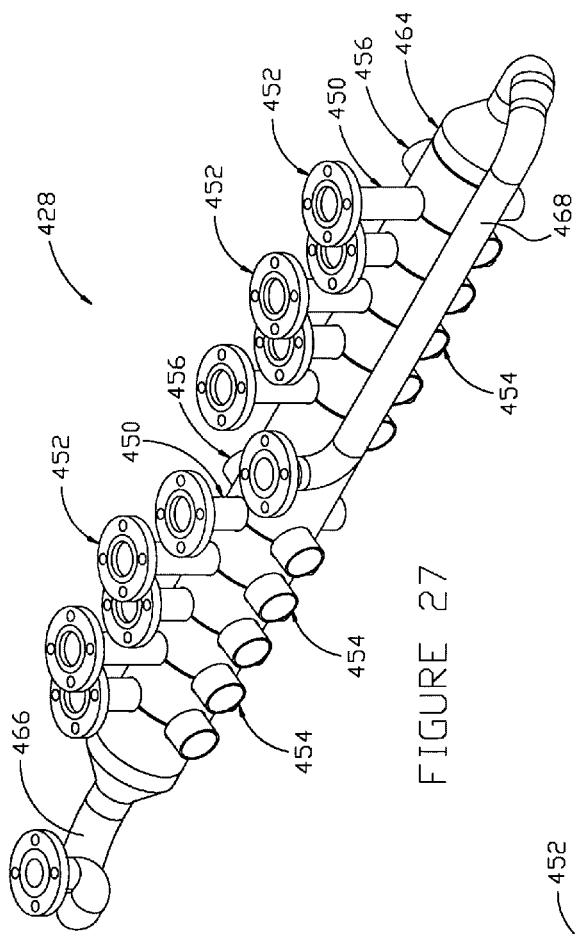
FIG. 27 is a perspective view of the nozzle plenum of the foamed asphalt cement nozzle manifold shown in FIGS. 19-23.

A plurality of asphalt cement outlet tubes 442 extend downwardly from chamber 436, each of which terminates in an attachment flange 444 (best shown in FIGS. 24-26). A plurality of clean-out tubes 446 are provided, each of which extends upwardly from chamber 436 and is in alignment with an asphalt cement outlet tube. Each clean-out tube 446 is provided with a clean-out cap 448 to provide access to the clean-out tube, and through it to the associated outlet tube.

Figure 31:
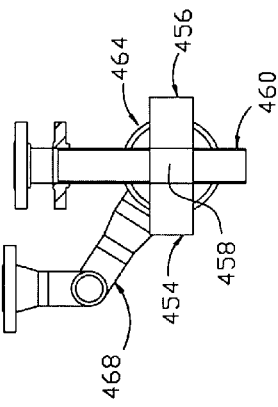
FIG. 31 is a sectional view taken through the line 31-31 of FIG. 29.
Figure 30:
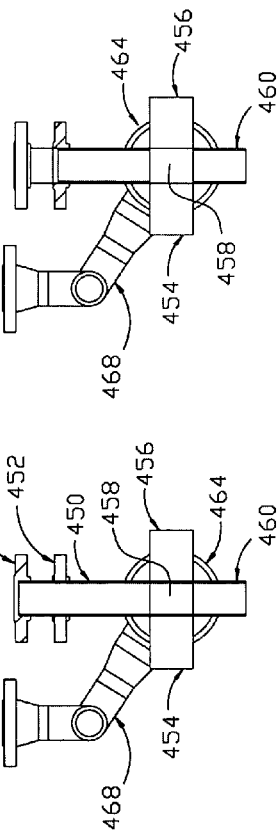
FIG. 30 is a sectional view taken through the line 30-30 of FIG. 29.
Figure 28:
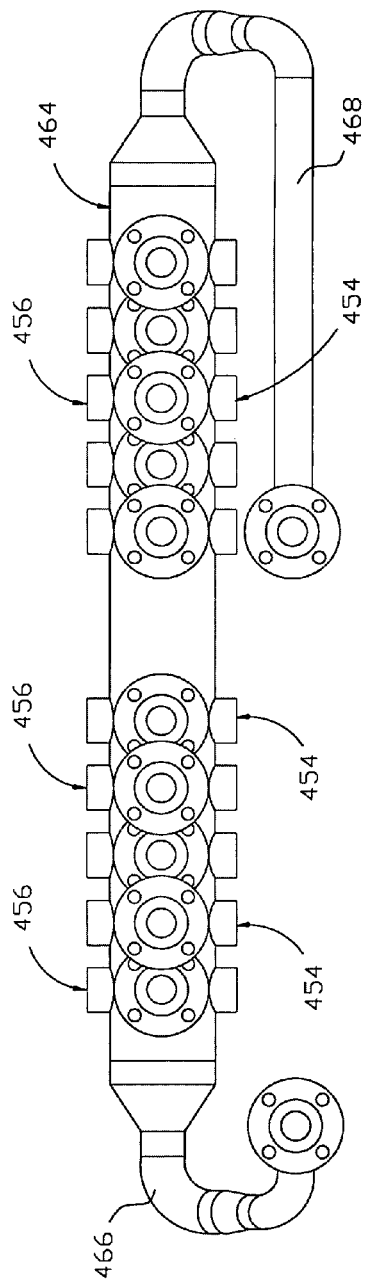
FIG. 28 is a top view of the nozzle plenum shown in FIG. 27.
Figure 29:
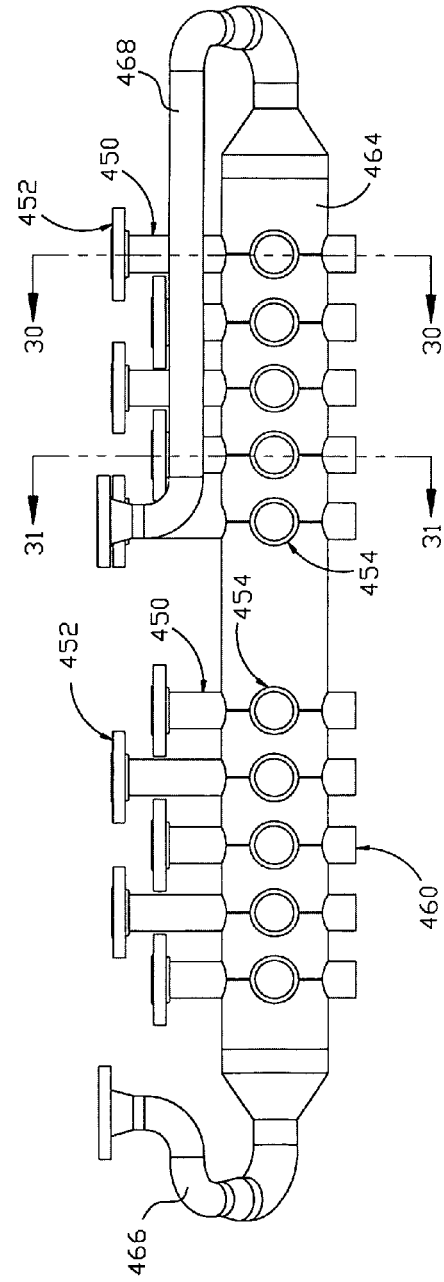
FIG. 29 is a front view of the nozzle plenum shown in FIGS. 27-28.

Nozzle plenum 428 includes a plurality of plenum inlet tubes 450, each of which is aligned with an asphalt cement outlet tube 442. A flange 452 at the upper end of each plenum inlet tube aligns with and connects to an attachment flange 444 at the lower end of each asphalt cement outlet tube. Preferably, the nozzle plenum also includes a plurality of water inlet tubes 454 and a plurality of air inlet tubes 456, each of which intersect a plenum inlet tube 450 to form an asphalt foam mixing chamber 458 therein. Extending downwardly from each asphalt cement mixing chamber is a foamed cement outlet tube 460 which terminates in a nozzle of conventional design (not shown). The foamed asphalt cement nozzle assembly is mounted at or near the top side of an asphalt mixer by means of flange 462 so that each foamed cement outlet tube can extend down into the mixer. Hot oil manifold 464 or other heating means is provided to maintain the temperature of the mixing chambers in the nozzle plenum at a suitable temperature for foaming of the asphalt cement. As best shown in FIGS. 30 and 31, hot oil manifold 464 includes hot oil inlet line 466 and hot oil outlet line 468 through which hot oil may be continuously circulated to maintain the temperature of foamed asphalt cement mixing chambers 458 within the range of about 230° F. to about 285° F., preferably about 270° F.

In the practice of the embodiment of the invention illustrated in FIGS. 19-31, liquid asphalt cement is introduced into chamber 436 of manifold 416 through inlet 438. Typically the asphalt cement from a conventional source will be at a temperature within the range of about 280° F. to about 350° F. From chamber 436, the liquid asphalt cement flows through each of outlet tubes 442 into an associated plenum inlet tube 450 and into foamed asphalt cement mixing chamber 458. At the same time, water at ambient temperature (or any other convenient temperature) is injected through each water inlet tube 454 at a rate of about 0.6-2% by volume of the rate of introduction of asphalt cement. If desired, air may also be injected into each mixing chamber through air inlet tubes 456. In any event, hot oil is continuously circulated through hot oil manifold 464, or another heating means is employed, to maintain the temperature of the mixing chambers 458 within the desired range. As a result, foamed asphalt cement is injected into the asphalt mixer through a plurality of nozzles. Preferably, this foamed asphalt cement is at a temperature within the range of about 230° F. to about 270° F., most preferably at about 250° F. Such foamed asphalt cement mixes with the heated and dried aggregate materials in the asphalt mixer to form asphalt concrete.

It has been found that foamed asphalt cement at a temperature within the desired range provides equivalent coating of aggregate materials to liquid asphalt cement at 360° F. Foaming of asphalt cement increases its volume by up to eighteen times. This acts to increase its surface area, so that even though it is at a lower temperature than conventional asphalt cement, its viscosity is low enough to provide sufficient aggregate coating and suitable compaction. Since the foamed asphalt cement is introduced at a temperature considerably lower than that utilized in the production of hot mix asphalt, less "blue smoke" is produced. More importantly, it is not necessary to provide as much heat in the asphalt mixer to insure proper coating of the aggregate materials. By reducing the temperature of the asphalt concrete produced by 50° F. (from 300° F. to 250° F.), a conventional asphalt mixer employing aggregate materials having 5% moisture and which operates at a rate of 300 tons per hour can save about 60 gallons of diesel fuel per hour.

Finally, it has also been found that the mixing of foamed asphalt cement with aggregate materials at a temperature at least as high as the boiling point of water and the maintenance of the resulting asphalt concrete mixture at a temperature at least as high as the boiling point of water allows the asphalt cement to remain in the foamed state in the mixture indefinitely.

Among the advantages of the invention is that it provides a method and apparatus for reducing the energy required for the production of asphalt concrete. Another advantage is that the invention provides a method and apparatus for producing asphalt concrete while minimizing the generation of "blue smoke".

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method for making asphalt concrete comprising:
   (A) providing a mixer that is adapted to mix aggregate materials and asphalt cement;
   (B) introducing aggregate materials into the mixer;
   (C) heating the aggregate materials to a temperature at least as high as the boiling point of water but no higher than about 285° F.;
   (D) providing a source of liquid asphalt cement;
   (E) providing a source of water;
   (F) providing a foamed asphalt cement nozzle assembly comprising:
      (1) a foamed cement mixing chamber;
      (2) means for heating the foamed cement mixing chamber;
      (3) a first inlet for liquid asphalt cement, said first inlet being in fluid communication with the liquid asphalt cement source and the foamed cement mixing chamber;
      (4) a second inlet for water, said second inlet being in fluid communication with the water source and the foamed cement mixing chamber;
      (5) an outlet for foamed asphalt cement, said outlet being in fluid communication with both the foamed cement mixing chamber and the mixer;
   (G) introducing the liquid asphalt cement to the foamed cement mixing chamber at an AC rate;
   (H) introducing the water to the foamed cement mixing chamber at an $H_2O$ rate which is no greater than about 2.0% by volume of the AC rate to produce foamed asphalt cement;
   (I) introducing foamed asphalt cement from the outlet of the nozzle assembly into the mixer;
   (J) mixing the foamed asphalt cement with aggregate materials at a temperature at least as high as the boiling point of water but no higher than about 285° F. to produce asphalt concrete.

2. The method of claim 1 which includes the following step after step
   (J) of claim 1:
   (K) maintaining the asphalt concrete at a temperature at least as high as the boiling point of water.

3. The method of claim 1 which includes the following steps instead of step (B) of claim 1:
   (B1) introducing a first amount by weight of aggregate materials into the mixer;
   (B2) introducing a second amount by weight of recycled asphalt product into the mixer, said second amount being no greater than the first amount;
and which includes the following step instead of step (C) of claim 1:
   (C1) heating the combination of aggregate materials and recycled asphalt product to a temperature at least as high as the boiling point of water but no higher than about 285° F.;
and which includes the following step instead of step (J) of claim 1:
   (J1) mixing the foamed asphalt cement with the combination of aggregate materials and recycled asphalt product at a temperature at least as high as the boiling point of water but no higher than about 285° F. to produce asphalt concrete.

4. The method of claim 1 which includes the following step instead of step (D) of claim 1:
(D1) providing a source of liquid asphalt cement at a temperature within the range of about 280° F. to about 350° F.;
and which includes the following step instead of step (F) of claim 1:
(F1) providing a foamed asphalt cement nozzle assembly comprising:
(1) a foamed cement mixing chamber;
(2) a first inlet for liquid asphalt cement, said first inlet being in fluid communication with the liquid asphalt cement source and the foamed cement mixing chamber;
(3) a second inlet for, water, said second inlet being in fluid communication with the water source and the foamed cement mixing chamber;
(4) an outlet for foamed asphalt cement, said outlet being in fluid communication with both the foamed cement mixing chamber and the mixer;
and which includes the following step instead of step (G) of claim 1:
(G1) introducing the heated liquid asphalt cement to the foamed cement mixing chamber at an AC rate.

5. The method of claim 1 which includes the following step instead of step (D) of claim 1:
(D2) providing a source of liquid asphalt cement having a penetration within the range of about 40 dmm to about 100 dmm, measured according to ASTM D5 at 25° C.

6. The method of claim 1 which includes the following step instead of step (D) of claim 1:
(D3) providing a source of liquid asphalt cement which includes a light oil component having a boiling point of at least 285° F.

7. The method of claim 1 which includes the following step instead of step (F) of claim 1:
(F2) providing a foamed asphalt cement nozzle manifold including a plurality of foamed asphalt cement nozzle assemblies, each of which comprises:
(1) a foamed cement mixing chamber;
(2) means for heating the foamed cement mixing chamber;
(3) a first inlet for liquid asphalt cement, said first inlet being in fluid communication with the liquid asphalt cement source and the foamed cement mixing chamber;
(4) a second inlet for water, said second inlet being in fluid communication with the water source and the foamed cement mixing chamber;
(5) an outlet for foamed asphalt cement, said outlet being in fluid communication with both the foamed cement mixing chamber and the mixer.

8. The method of claim 1 which includes the following steps instead of steps (G) and (H) of claim 1:
(G2) providing an asphalt cement manifold to convey liquid asphalt cement from the source of liquid asphalt cement to the foamed asphalt cement nozzle assembly;
(G3) providing an oil manifold having oil circulating therein at an oil temperature within the range of about 250° F. to about 400° F.; said oil manifold being configured and arranged to transfer heat to the liquid asphalt cement in the asphalt cement manifold;
(G4) introducing the liquid asphalt cement from the asphalt cement manifold to the foamed cement mixing chamber at an AC rate;
(G5) introducing the water to the foamed cement mixing chamber at an $H_2O$ rate which is about 0.6-2.0% by volume of the AC rate;
wherein the oil temperature, the AC rate and the $H_2O$ rate are selected so that foamed asphalt cement is produced in the foamed cement mixing chamber.

9. The method of claim 1 which includes the following steps instead of steps (G) and (H) of claim 1:
(G6) introducing the liquid asphalt cement to the foamed cement mixing chamber at an AC temperature and an AC rate;
(G7) introducing the water to the foamed cement mixing chamber at an $H_2O$ rate which is about 0.6-2.0% by volume of the AC rate;
(G8) heating the foamed cement mixing chamber to a foaming temperature within the range of about 230° F. to about 285° F.;
wherein the AC temperature, the AC rate, the $H_2O$ rate and the foaming temperature are selected so that foamed asphalt cement is produced in the foamed cement mixing chamber.

10. The method of claim 9 wherein the AC temperature is within the range of about 280° F. to about 350° F. and the AC rate is within the range of about 8.5 gallons/minute to about 180 gallons/minute.

11. The method of claim 10 wherein the foamed cement mixing chamber is heated to the foaming temperature by the introduction of the liquid asphalt cement to the foamed cement mixing chamber at the AC temperature.

12. The method of claim 1 which includes the following step instead of step (A) of claim 1:
(A1) providing a mixer that is adapted to mix aggregate materials and asphalt cement, said mixer comprising:
(1) a fixed outer drum having:
(a) a longitudinal axis inclined with respect to the horizontal so that said outer drum has an upper end and a lower end;
(b) an outer drum diameter;
(c) an outlet for asphalt concrete at the upper end thereof;
(2) a rotatable inner drum having:
(a) a longitudinal axis that is coincident with the longitudinal axis of the fixed outer drum;
(b) an upper end and a lower end;
(c) an inlet for aggregate materials at the upper end thereof;
(d) an outer surface with a plurality of outer mixing flights disposed thereon;
(e) an inner surface with a plurality of inner mixing flights disposed thereon;
(f) an inner drum diameter that is less than the outer drum diameter;
wherein the inner drum is disposed within the fixed outer drum so that an annular mixing chamber is defined between the inner drum and the outer drum; and
wherein the inner drum has an outlet at the lower end thereof through which aggregate materials are discharged into the annular mixing chamber; and
wherein the inner drum is adapted to transfer heat from inside the inner drum to the annular mixing chamber;
(3) means for rotating the inner drum with respect to the fixed outer drum;
(4) means for heating the interior of the inner drum so that aggregate materials therein are heated to a temperature at least as high as the boiling point of water but no higher than about 285° F.;
wherein the inner mixing flights are sized and arranged so that rotation of the inner drum with respect to the outer drum will cause aggregate materials that are introduced through the inlet of the inner drum to move towards the outlet of the inner drum and be discharged therethrough into the annular mixing chamber, and wherein the outer mixing flights are sized and arranged so that rotation of the inner drum with respect to the outer drum will cause aggregate materials in the annular mixing chamber to be mixed with asphalt cement in such annular mixing chamber to produce asphalt concrete, and will further cause such asphalt concrete to move towards the outlet of the outer drum and be discharged therethrough; and wherein heat is transferred from inside the inner drum to the annular mixing chamber so that the temperature therein is at least as high as the boiling point of water;

and which includes the following step instead of step (B) of claim 1:

(B3) introducing aggregate materials through the inlet of the inner drum into the inner drum;

and which includes the following steps instead of step (C) of claim 1:

(C2) heating the aggregate materials in the inner drum to a temperature at least as high as the boiling point of water but no higher than about 285° F.;

(C3) rotating the inner drum with respect to the outer drum and thereby conveying the heated aggregate materials through the outlet of the inner drum and into the annular mixing chamber;

and which includes the following step instead of step (F) of claim 1:

(F3) providing a foamed asphalt cement nozzle assembly comprising:
(1) a foamed cement mixing chamber;
(2) means for heating the foamed cement mixing chamber;
(3) a first inlet for liquid asphalt cement, said first inlet being in fluid communication with the liquid asphalt cement source and the foamed cement mixing chamber;
(4) a second inlet for water, said second inlet being in fluid communication with the water source and the foamed cement mixing chamber;
(5) an outlet for foamed asphalt cement, said outlet being in fluid communication with both the foamed cement mixing chamber and the annular mixing chamber;

and which includes the following step instead of step (I) of claim 1:

(I1) introducing foamed asphalt cement from the outlet of the nozzle assembly into the annular mixing chamber;

and which includes the following step instead of step (J) of claim 1:

(J2) rotating the inner drum with respect to the outer drum and thereby mixing the foamed asphalt cement with aggregate materials at a temperature at least as high as the boiling point of water but no higher than about 285° F. to produce asphalt concrete.

13. The method of claim 12 which includes the following step instead of step (A1) of claim 12:

(A2) providing a mixer that is adapted to mix aggregate materials and asphalt cement, said mixer comprising:
(1) a fixed outer drum having:
(a) a longitudinal axis inclined with respect to the horizontal so that said outer drum has an upper end and a lower end;
(b) an outer drum diameter;
(c) an outlet for asphalt concrete at the upper end thereof;
(2) an inner drum disposed within the fixed outer drum, said inner drum having:
(a) a longitudinal axis that is coincident with the longitudinal axis of the fixed outer drum;
(b) an upper end and a lower end;
(c) an inlet for aggregate materials at the upper end thereof;
(d) an outer surface with a plurality of outer mixing flights disposed thereon;
(e) an inner surface with a plurality of inner mixing flights disposed thereon;
(f) an inner drum diameter that is less than the outer drum diameter;

wherein the inner drum is disposed within the fixed outer drum so that an annular mixing chamber is defined between the inner drum and the outer drum; and wherein the inner drum has an outlet at the lower end thereof through which aggregate materials are discharged into the annular mixing chamber; and wherein the inner drum is adapted to transfer heat from inside the inner drum to the annular mixing chamber; and wherein the outer drum includes an inlet for recycled asphalt product into the annular mixing chamber;

(3) means for rotating the inner drum with respect to the fixed outer drum;

(4) means for heating the interior of the inner drum so that aggregate materials therein are heated to a temperature at least as high as the boiling point of water but no higher than about 285° F., and so that heat is transferred from the inner drum to the annular mixing chamber;

wherein the inner mixing flights are sized and arranged so that rotation of the inner drum with respect to the outer drum will cause aggregate materials that are introduced through the inlet to move towards the outlet of the inner drum and be discharged therethrough into the annular mixing chamber; and wherein the outer mixing flights are sized and arranged so that rotation of the inner drum with respect to the outer drum will cause aggregate materials and recycled asphalt product in the annular mixing chamber to be mixed with asphalt cement to produce asphalt concrete, and will further cause such asphalt concrete to move towards the outlet of the outer drum and be discharged therethrough;

and which includes the following steps instead of step (B3) of claim 12:

(B4) introducing aggregate materials through the inlet of the inner drum into the inner drum;

(B5) introducing recycled asphalt product through the inlet of the outer drum into the annular mixing chamber;

and which includes the following step instead of step (J2) of claim 12:

(J3) rotating the inner drum with respect to the outer drum and thereby mixing the foamed asphalt cement with the heated aggregate materials and the recycled asphalt product to produce asphalt concrete.

* * * * *